US006185308B1

(12) United States Patent
Ando et al.

(10) Patent No.: US 6,185,308 B1
(45) Date of Patent: Feb. 6, 2001

(54) KEY RECOVERY SYSTEM

(75) Inventors: Hiroyuki Ando; Ichirōu Mōrita; Yasutsugu Kuroda; Naoya Torii, all of Kawasaki; Masashi Yamazaki, Tokyo; Hiroshi Miyauchi, Tokyo; Kazue Sako, Tokyo; Seiichi Domyo, Fujisawa; Hiroyoshi Tsuchiya; Seiko Kanno, both of Yokohama, all of (JP)

(73) Assignees: Fujitsu Limited, Kawasaki; NEC Corporation; Hitachi, Ltd., both of Tokyo, all of (JP)

( * ) Notice: Under 35 U.S.C. 154(b), the term of this patent shall be extended for 0 days.

(21) Appl. No.: 09/048,096

(22) Filed: Mar. 26, 1998

(30) Foreign Application Priority Data

Jul. 7, 1997 (JP) .................................................. 9-181627

(51) Int. Cl.[7] ....................................................... H04L 9/00
(52) U.S. Cl. ............................ 380/286; 380/44; 380/279; 380/281; 713/162; 713/182; 713/168; 713/171
(58) Field of Search .............................. 380/44, 279, 281, 380/286; 713/162, 182, 168, 171

(56) References Cited

U.S. PATENT DOCUMENTS 5,436,972 * 7/1995 Fischer .................................. 380/286
5,442,691 * 8/1995 Price et al. ........................... 379/220
5,557,765 * 9/1996 Lipner et al. ........................ 380/286
5,937,066 * 8/1999 Gennaro et al. ..................... 380/286

OTHER PUBLICATIONS

Kazutoyo Awata, et al., "File Encryption system Using Public Key Cryptography", *The 47th Nation-wide Conference of the Information Processing Society of Japan*, Sep. 27, 1993, pp. 4–197 to 4–198.

* cited by examiner

Primary Examiner—Tod R. Swann
Assistant Examiner—Ronald Sulpizio
(74) Attorney, Agent, or Firm—Staas & Halsey LLP

(57) ABSTRACT

A key recovery information distribution device is provided between a recoverer device and a key recovery device, recovers a data key for the recoverer device, and reduces the load of the recoverer device. Data is encrypted using the data key and stored with key recovery information. The recoverer device which decrypts the encrypted data distributes the key recovery information to key recovery devices through the key recovery information distribution device to recover key information. A recoverer is authenticated directly between the key recovery device and the recoverer device, and then the key information is transmitted to the recoverer device, and the recoverer device recovers the data key.

35 Claims, 22 Drawing Sheets

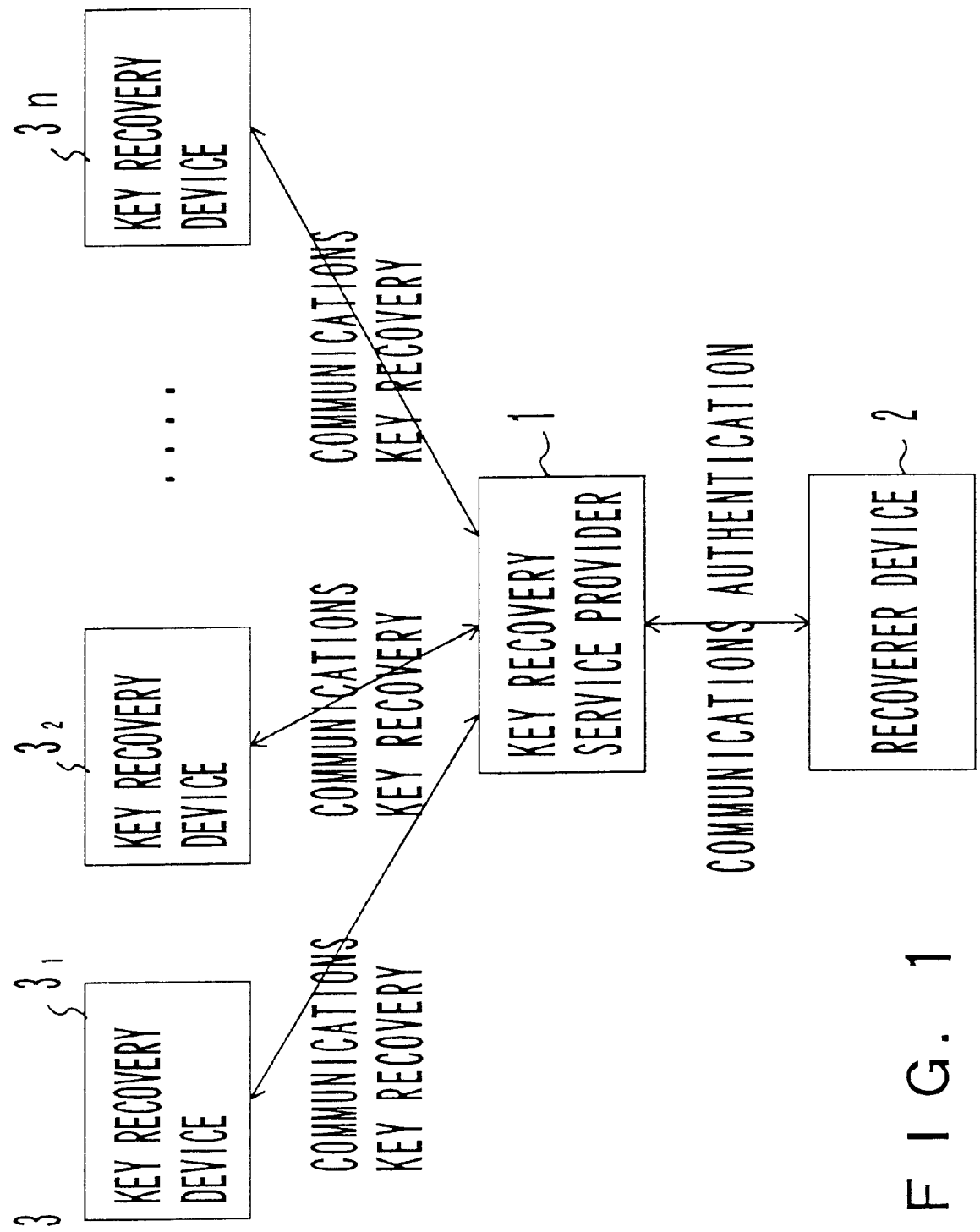
F I G. 1

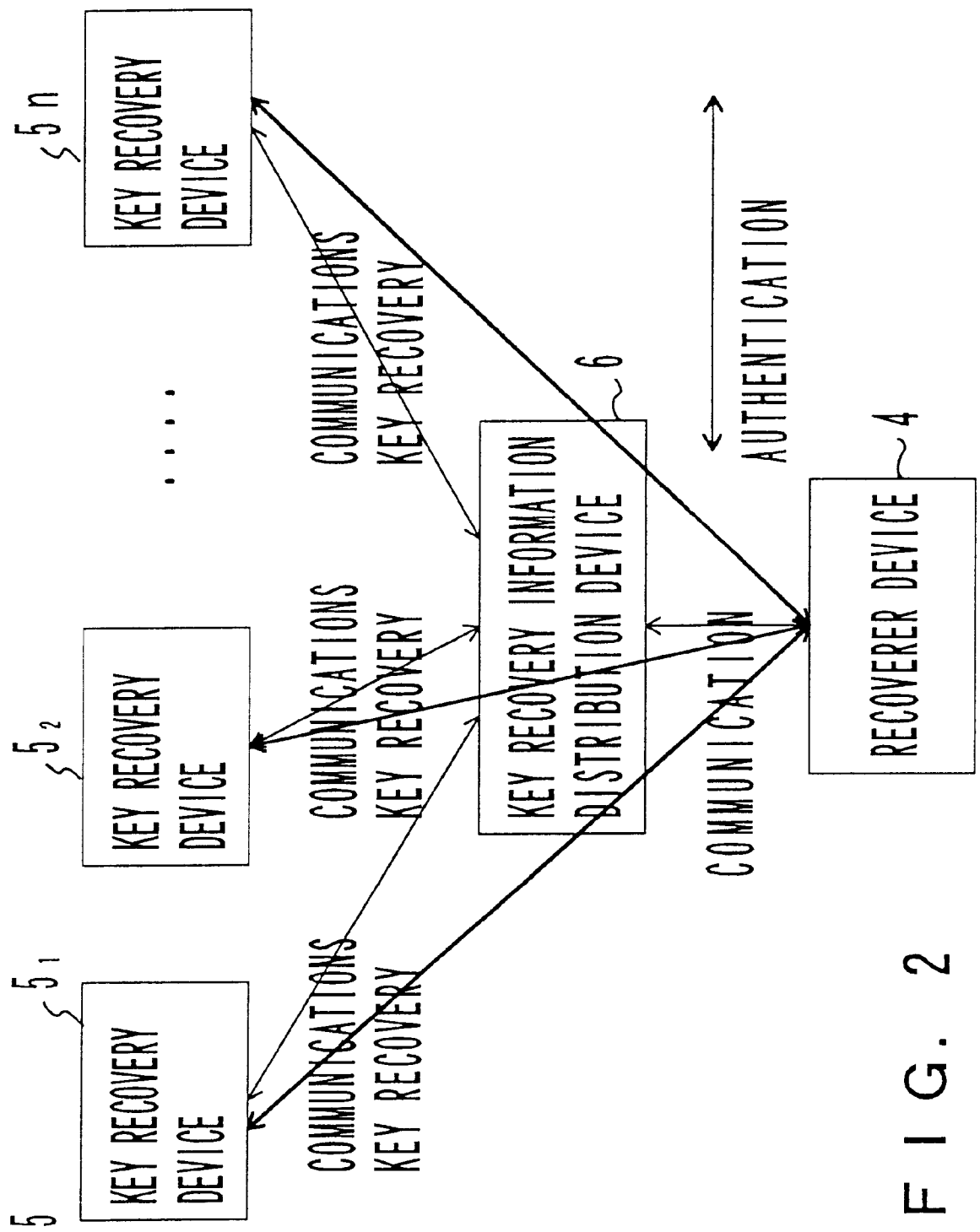
F I G. 2

| ID | NAME | ACCESS DESTINATION | PROTOCOL |
|---|---|---|---|
| ID1 | KEY RECOVERY DEVICE OF COMPANY A | 133.160.30.7 | UNIQUE PROTOCOL |
| ID2 | KEY RECOVERY DEVICE OF COMPANY B | kr.or.jp | http |
| ... | ... | ... | ... |
| IDn | N RECOVERY DEVICE | /C=JP/o=KR/ | DERECTORY SERVICE |

F I G. 1 1

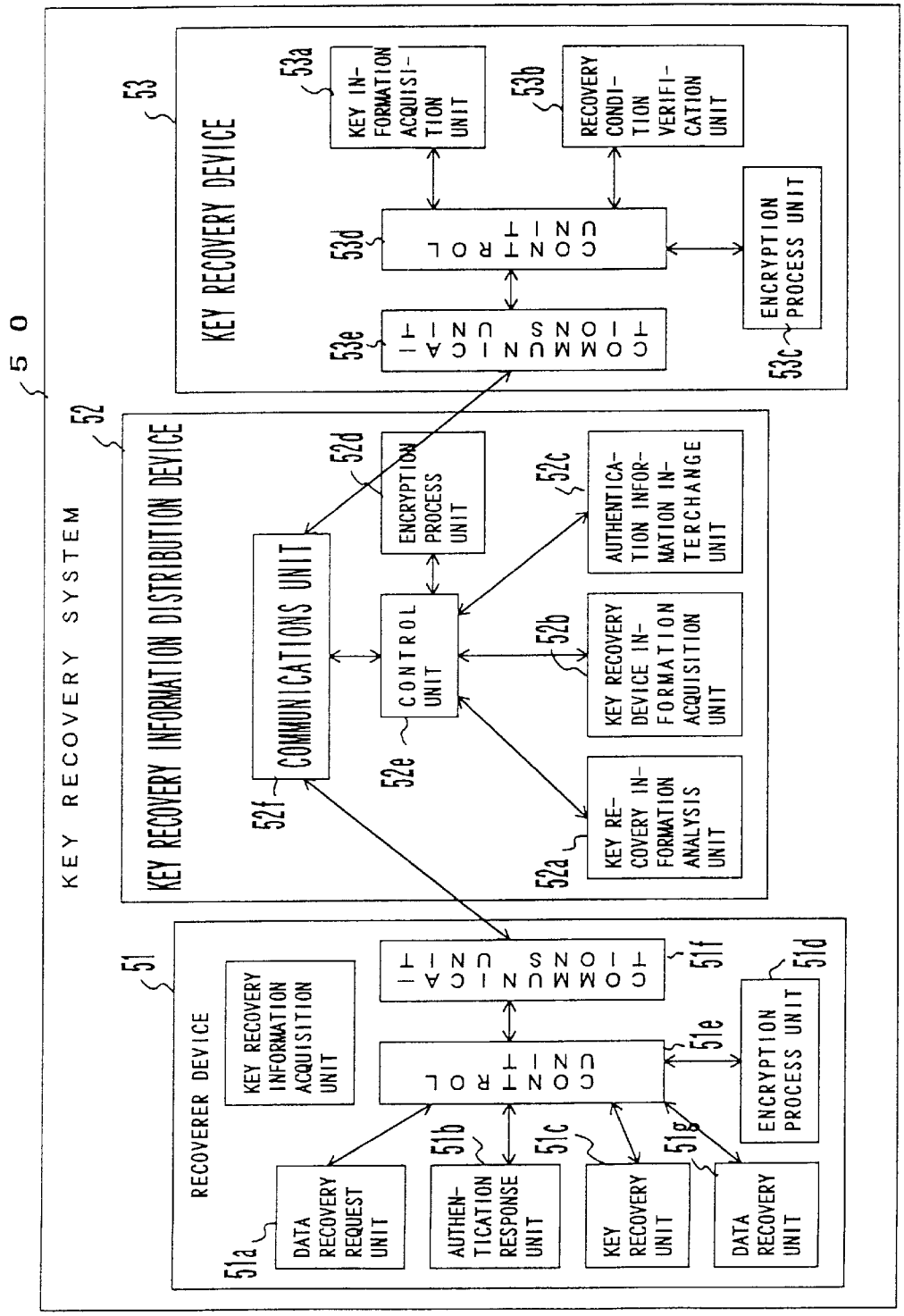
F I G. 1 8

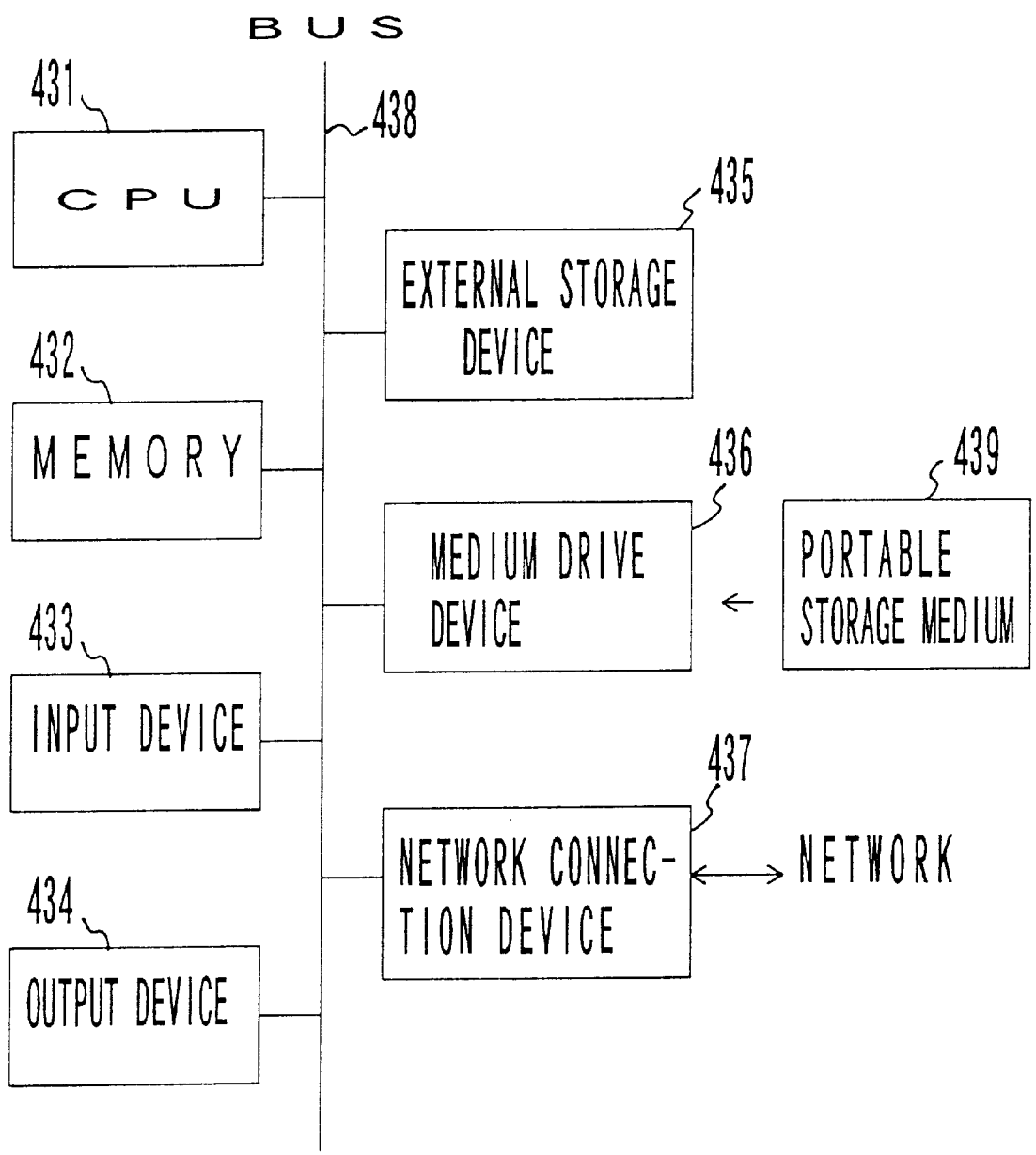
F I G. 2 2

KEY RECOVERY SYSTEM

BACKGROUND OF THE INVENTION

1. Field of the Invention

The present invention relates to a key recovery system for recovering a key to an encrypted sentence in an emergency when an operator on the user side is absent, when a user loses his or her private key, etc. in encrypting data using a key and storing the encrypted data as an encrypted sentence.

2. Description of the Related Art

There are two methods of realizing a key recovery system, that is, a method of previously depositing a key of each user; and a method of encrypting a data key using a system key. The present invention relates to a key recovery system according to the latter method.

When data is encrypted, each user encrypts, using a preliminarily obtained system key (hereinafter referred to as a public key), a key for use in encrypting data (hereinafter referred to as a data key), and stores the encrypted data, the encrypted data key, and a recovery condition as key recovery information.

The above described public key is obtained from at least one key recovery device (also referred to as a key recovery center).

When the user possesses a private key, the user decrypts encrypted data by decrypting using a private key a data key encrypted using the user's public key. If the user has lost the private key or the third party urgently needs to decrypt the encrypted data, key recovery information attached to the encrypted data is retrieved and is transmitted to the key recovery device in order to recover the data key through the key recovery device.

The key recovery device refers to the key recovery information, checks whether or not a recoverer who attempts recovery has a recovery right. If yes, the data key is recovered from the key recovery information, and is output to the recoverer.

In the conventional key recovery system, a key recovery device has a private key, and therefore can recover all encrypted sentences provided with the key recovery information encrypted using its public key. To avoid this, it is necessary to distribute the recovery ability of the key recovery device. Thus, a plurality of key recovery devices are provided, and key recovery information is generated from a plurality of public keys of the plurality of key recovery devices so that a key cannot be recovered without obtaining agreements of all key recovery devices.

FIG. 1 shows the SKR (secure key recovery) system of IBM as an example of the conventional technology. As shown in FIG. 1, the system includes a key recovery service provider 1. A recoverer device 2 is checked by the key recovery service provider 1 for authentication. If the key recovery service provider 1 has authenticated the recoverer device 2, then the key recovery service provider 1 transmits key recovery information to a key recovery device 3, each of the key recovery devices 3 recovers key information, and the key is returned to the recoverer device 2 through the key recovery service provider 1 based on the key information.

According to the conventional system shown in FIG. 1, a data key is recovered based on the authentication between the key recovery service provider 1 and the recoverer device 2. Therefore, if a sentence encrypter specifies a recovery condition for each key recovery device, the key recovery service provider 1 may not perform an authenticating process depending on a key recovery device due to a large overhead, resulting in an impossible key recovery.

If the key recovery service provider 1 illegally authenticates a recoverer, there is the problem that all encrypted sentences are recovered by the key recovery service provider 1.

SUMMARY OF THE INVENTION

The present invention aims at providing a key recovery system for allowing a recoverer device and a key recovery device to directly authenticate a recoverer in order to provide a key for the recoverer device based on the authentication although direct communications between the recoverer device and all key recovery devices are not performed and in other words, all the communications between the recoverer device and all key recovery devices are performed through the key recovery service provider.

To solve the above described problems with the conventional technology, the key recovery service provider is replaced with a key recovery information distribution device. The key recovery information distribution device manages all information about relevant key recovery devices, and enables the communications between a recoverer device and the key recovery devices to be established at a request of the recoverer device. However, the key recovery information distribution device does not authenticate any recoverer device. A recoverer device is authenticated directly by a key recovery device. In this case, the key recovery information distribution device establishes communications between the key recovery device and the recoverer device. Based on the authentication, a key recovery system for finally providing a data key for the recoverer device can be obtained.

According to an aspect of the present invention, a key recovery system stores encrypted data, a data key encrypted by a public key, and key recovery information. It normally recovers the encrypted data using the data key. However, when there is no key for decrypting the data key, the key recovery system retrieves the data key from the key recovery information added to the encrypted data, and decrypts the encrypted data. The key recovery system includes a recoverer device for requesting key recovery; a key recovery information distribution device for providing a communications line for a key recovery device at a recovery request; and at least one key recovery device for decrypting and retrieving all or a part of a data key from key recovery information, and authenticating a recoverer directly with the recoverer device.

According to another aspect of the present invention, a key recovery system includes a recoverer device for storing an encrypted sentence with key recovery information, transmitting a key recovery request when it is issued, transmitting authentication response information corresponding to authentication information input by a key recoverer when an authentication request is received, and recovering the data key when key information is received; a key recovery information distribution device for obtaining access information about a key recovery device according to key recovery information from a database when the key recovery information is received from the recoverer device, transmitting the authentication request to the recoverer device when the authentication request is received, transmitting an authentication response to the key recovery device when the authentication response is received from the recoverer device, and transmitting key information to the recoverer device when the key information is received; and a key recovery device for obtaining the key information from the key recovery information when the key recovery information is received, transmitting the authentication request using the key information to the recoverer device through the key recovery information distribution device, verifying the authentication response when the authentication response is received from the recoverer device, and transferring the key information to the recoverer device through the key recovery information distribution device when the verification result is correct.

According to a further aspect of the present invention, a key recovery system includes a recoverer device for requesting recovery of a data key; a key recovery information distribution device for providing a communications line for a corresponding key recovery device at a request for key recovery; at least one key recovery device for decrypting and retrieving a part of data key information from key recovery information; a unit for transmitting the key recovery information from the key recoverer device to each of the key recovery devices through the key recovery information distribution device in order to recover the data key and a recovery condition; a unit for allowing the recoverer device and the key recovery device to directly authenticate a recoverer under the recovery condition; and a unit for transmitting a key recovered by the key recovery device to the recoverer device when the recoverer is successfully authenticated.

According to a further aspect of the present invention, a key recovery method recovers a data key when there is no key for decrypting the data key using a recoverer device for requesting recovery of a data key; a distribution device for providing a communications line for a corresponding key recovery device at a request to recover the data key; and at least one key recovery device for decrypting and retrieving a part of data key information from key recovery information. The key recovery method includes a step of transmitting the key recovery information from the recoverer device to each key recovery device through a key recovery information distribution device to recover a data key and a recovery condition; a step of allowing the recoverer device and the key recovery device to directly authenticate a recoverer under the recovery condition; and a step of transmitting data key information recovered by the key recovery device to the recoverer device when the recoverer is successfully authenticated.

According to a further aspect of the present invention, a storage medium stores key recovery information containing encrypted data, a data key encrypted with a public key, and a recovery condition, and the present invention also provides a storage medium used to direct a computer to perform: a recoverer function for normally recovering the encrypted data using the data key, but requesting recovery of the key when the encrypted data is to be decrypted without private key for decrypting the data key; the key recovery information distribution function for providing a communications line for a corresponding key recovery function at a recovery request; and at least one key recovery function for decrypting and retrieving all or a part of the data key from the key recovery information and allowing the key recoverer function and the key recovery function to authenticate a recoverer.

BRIEF DESCRIPTION OF THE DRAWINGS

FIG. 1 is a block diagram showing the conventional key recovery system whose authority is distributed;

FIG. 2 is a block diagram showing the principle of the key recovery system according to the principle of the present invention;

FIG. 11 shows a correspondence table between a key recovery device ID provided in the key recovery information distribution device and its access method;

FIG. 18 is a block diagram showing a further embodiment of the present invention;

FIG. 22 is a block diagram showing the computer device which realizes the present invention and has a storage medium.

DESCRIPTION OF THE PREFERRED EMBODIMENTS

Figure 3:
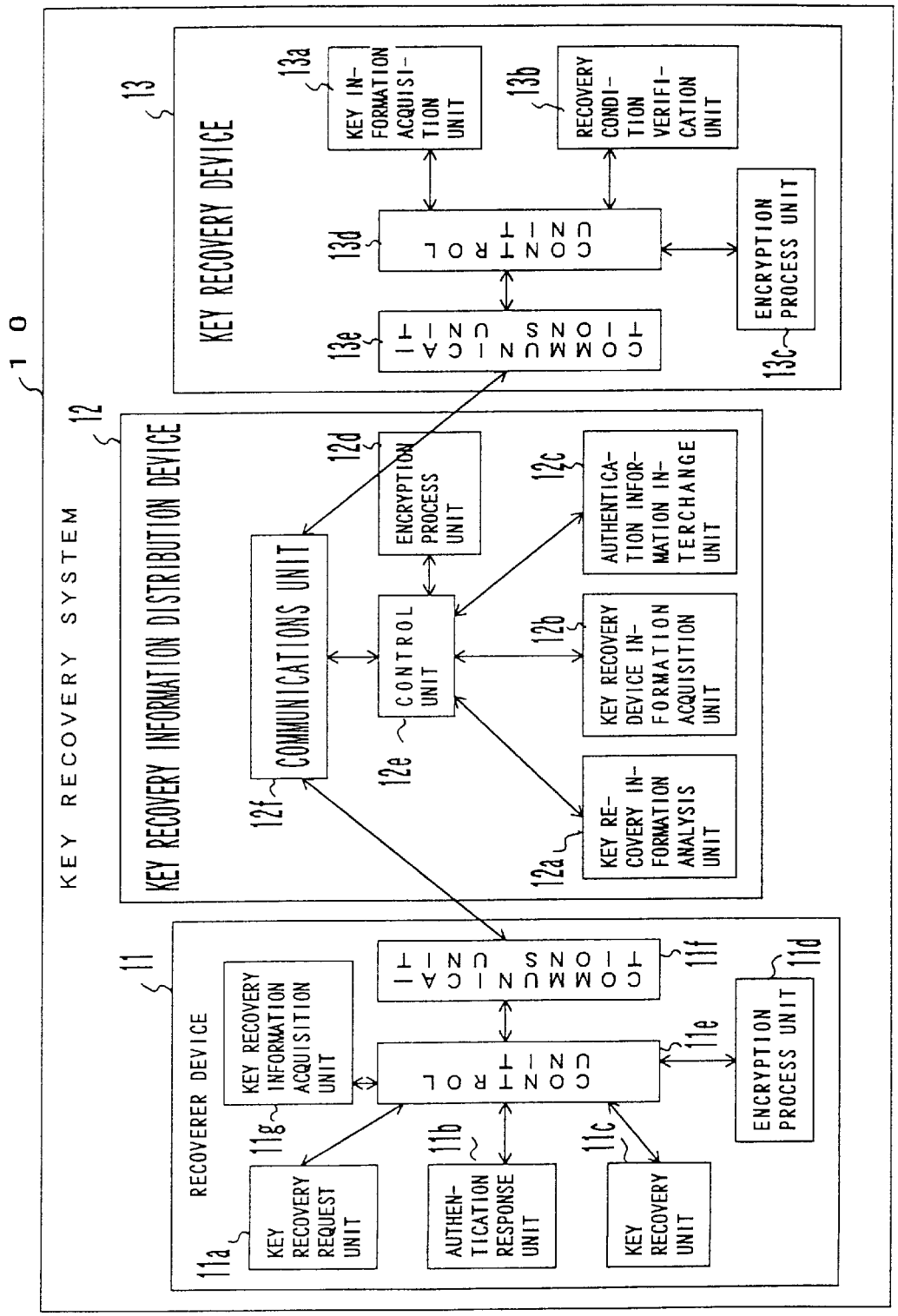
FIG. 3 is a block diagram showing an embodiment of the key recovery system according to the present invention.

FIG. 2 shows the principle of the present invention.

In FIG. 2, a recoverer device 4 specifies an encrypted sentence to be recovered by a recoverer, performs a process satisfying an authentication condition directly requested by a key recovery device 5, and obtains a key when the recoverer is successfully authenticated.

A key recovery information distribution device 6 receives a recovery request from the recoverer device 4, communicates with the key recovery device 5 specified by key recovery information, passes to the recoverer device the authentication request information for a recoverer requested from the recoverer device 4, and passes the key information recovered by the key recovery device 5 to the recoverer device 4. The key recovery device 5 receives a recovery request from the key recovery information distribution device 6, transmits and receives the authentication information directly to and from the recoverer device 4 through the key recovery information distribution device, and recovers the key information if the recoverer is successfully authenticated.

For example, if an encrypter, who is a testator, stores a testament encrypted by a data key in the recoverer device 4 together with the key recovery information. Assume that the testator who is to decrypt the encrypted testament has lost his private key, or a person who is authorized to read the testament urgently has to decrypt the testament.

The key recovery information ID, P(K), K(RC) containing the ID of the recoverer device 4, the public key P, the data key K, and the recovery condition RC is transmitted from the recoverer device 4 to the key recovery device 5 through the key recovery information distribution device using the ID of the key recovery device 5. The key recovery device 5 decrypts the key information using the private key S instead of the public key P, and recovers the recovery condition RC according to the key information. The recovery condition RC can be a password or an ID of a key recoverer, text data, etc. When the recovery condition RC specifies a password, the key recovery device 5 issues an authentication request to the recoverer device 4. The recoverer device 4 inputs, for example, the password of a recoverer in response to the authentication request. Then, the recoverer device 4 transmits the password of the key recoverer to the key recovery device 5, compares it with the password of the key recoverer stored in the recovery condition verification unit. If the passwords match each other, it is considered that the recoverer device 4 and the key recovery device 5 have directly authenticated the recoverer. Then, the key recovery device 5 transmits key information to the recoverer device. The key recovery device 5 decrypts the encrypted sentence using a data key K.

According to the present invention, when an authentication response is received from the key recovery device 5, it is determined that the passwords specified as a recovery condition match between the password input by the recoverer device 4 and the password stored in the key recovery device 5. Thus, the recoverer device 4 and the key recovery device 5 directly authenticate the recoverer. As a result, the key recovery information distribution device cannot illegally authenticate a recoverer for the recovery of a data key by replacing the recoverer.

Furthermore, according to the present invention, the information management performed by the recoverer device 4 for the key recovery device 5 can be reduced by distributing the authority for key recovery. Additionally, by authenticating a recoverer directly with the key recovery device 5, various authentication conditions can be applied, and the problem that the key recovery information distribution device cannot process these various authentication conditions can be suppressed.

FIG. 3 shows an embodiment of the present invention.

A key recovery system 10 according to the present invention comprises a recoverer device 11, a key recovery information distribution device 12, and a key recovery device 13.

The recoverer device 11 comprises a key recovery request unit 11a, an authentication response unit 11b, a key recovery unit 11c, an encryption process unit 11d, a control unit 11e, and a communications unit 11f. The key recovery information acquisition unit 11g obtains key recovery information ID, P(K) K (RC). The ID indicates the identifier of a key recovery device. The P indicates a public key obtained from the key recovery device. The RC indicates a recovery condition of each key recovery device. Furthermore, data (an original sentence) is encrypted using the data key K, and the data key K is encrypted by the public key of the recoverer device 11, thereby generating an encrypted sentence. The encrypted sentence is provided with key recovery information and stored in the recoverer device.

The key recovery information distribution device 12 comprises a key recovery information analysis unit 12a, a key recovery device information acquisition unit 12b, an authentication information interchange unit 12c, an encryption process unit 12d, a control unit 12e, and a communications unit 12f.

The key recovery device 13 comprises a key information acquisition unit 13a, a recovery condition verification unit 13b, an encryption process unit 13c, a control unit 13d, and a communications unit 13e.

Figure 4:
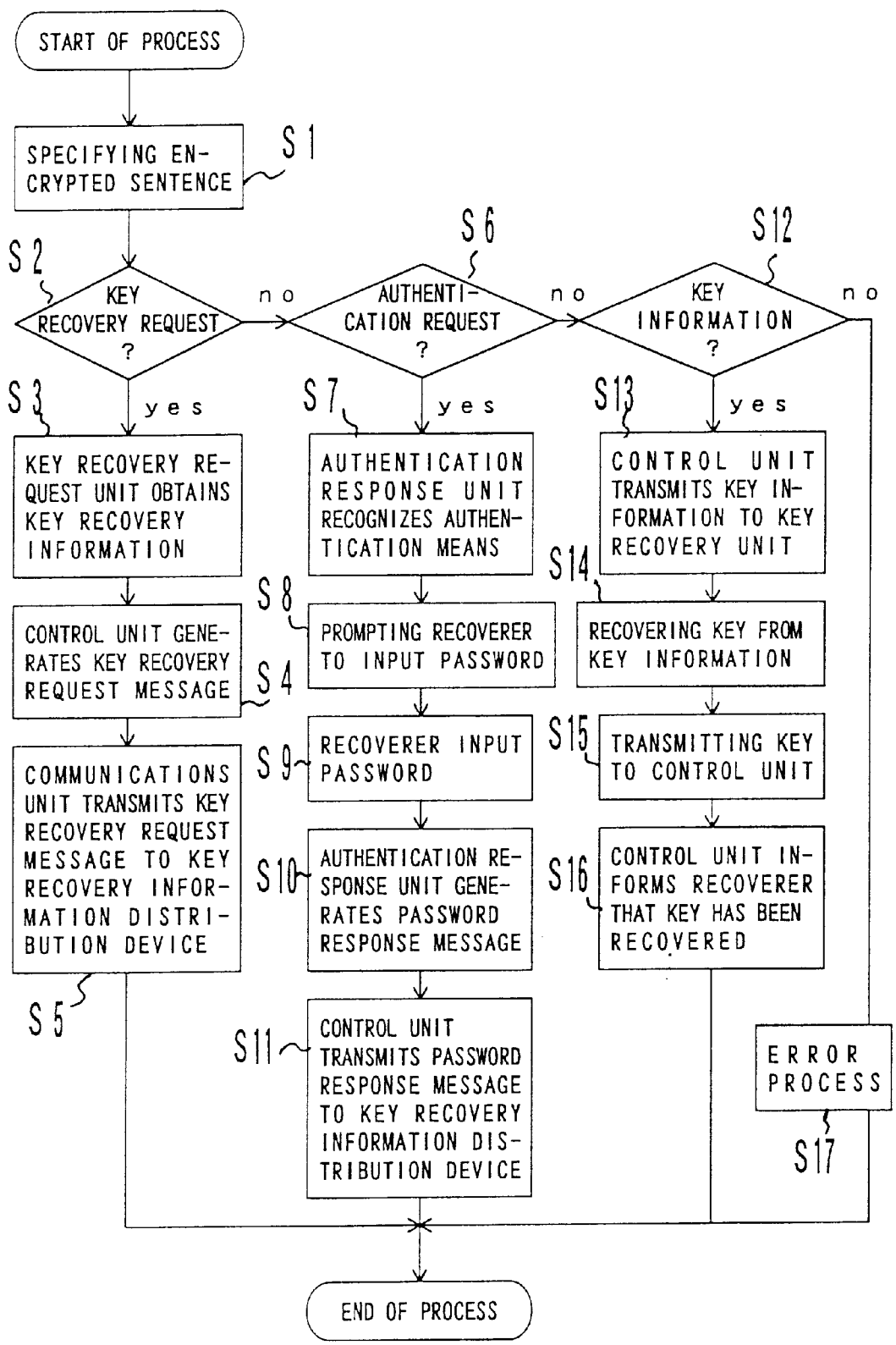
FIG. 4 is a flowchart showing the operation of the recoverer device according to the second embodiment.

FIG. 4 is a flowchart showing the operations of the recoverer device according to the embodiment shown in FIG. 3. Normally, the recoverer device uses its private key to decrypt the data key encrypted by its public key, and decrypts an encrypted original sentence using the decrypted data key. However, if the key recoverer has lost his or her private key, cannot decrypt the data key, and has to recover the data key, that is, if a key recovery request is issued from a recoverer device, then an encrypted sentence to be decrypted should be specified first (steps S1 and S2). The key recovery request unit 11a obtains key recovery information (step S3). The control unit 11e generates a key recovery request message (step S4). The communications unit 11f transmits a key recovery request message to the key recovery information distribution device (step S5). That is, if a key recovery requester has lost his or her private key, then the key recovery request is transmitted to the key recovery information distribution device 12.

If the transmitted request is not a key recovery request, but an authentication request (step S6), then the authentication response unit 11b recognizes, for example, a password, as an authentication means in a password, ID, text data, etc. (step S7), and prompts a password from the key recoverer (step S8). The key recoverer inputs a password, the authentication response unit 11b generates a password return message containing the password (steps S9 and S10), and the communications unit 11f transmits the password return message to the key recovery information distribution device 12 (step S11).

If the transmitted request is not an authentication request, then it is determined whether or not it is key information (step S12). If it is key information, then the communications unit 11f transmits the key information to the key recovery unit 11c (step S13). Key information refers to keys K1, K2, K3, . . . , Kn transmitted from key recovery devices 13. Then, exclusive logical sums are obtained from the key information K1, K2, K3, . . . , Kn to recover the data key K (step S14).

According to the present embodiment, the data key is generated through exclusive logical sums, but a key distribution method such as a threshold method can be adopted.

Next, the data key K is transmitted to the control unit (step S15), and the control unit 11e informs the recoverer device 11 that the data key has been recovered (step S16). If the transmitted request is not key information or any of the above described information, then an error process is performed (step S17).

Figure 5:
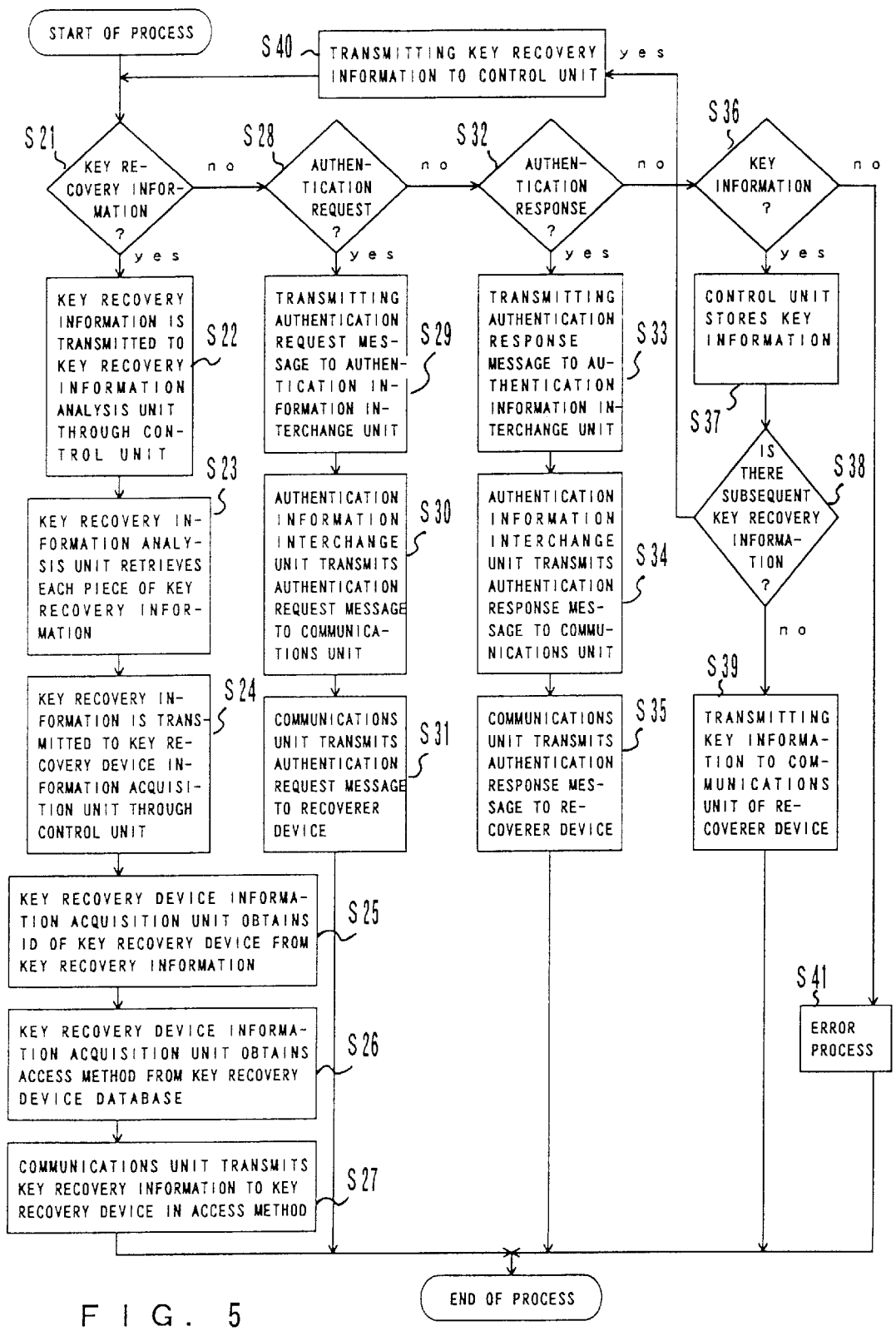
FIG. 5 is a flowchart showing the operations of the key recovery information distribution device according to the embodiment shown in FIG. 2.

FIG. 5 is a flowchart showing the operations of the key recovery information distribution device 6. First, when a certain encrypted sentence is transmitted from a key recoverer and the sentence refers to key recovery information (step S21), then the control unit 12e transmits the key recovery information to the key recovery information analysis unit 12a (step S22). The key recovery information analysis unit 12a retrieves each piece of key recovery information (step S23).

Then, the key recovery information is transmitted to the key recovery device information acquisition unit 12b through the control unit 12e (step S24).

The key recovery device information acquisition unit 12b obtains the ID of the key recovery device 13 from the key recovery information (step S25). The key recovery device information acquisition unit 12b obtains an access method using the ID of the key recovery device from the key recovery device database shown in FIG. 11 (step S26).

The communications unit transmits the key recovery information to the key recovery device 13 according to the access method (step S27). The operations in steps S28 through S31 are performed when it is determined that the authentication request from the key recovery device has been received. That is, an authentication request message is transmitted to the authentication information interchange unit 12c. The authentication information interchange unit 12c transmits the authentication request message to the communications unit 12f. The communications unit 12f transmits the authentication request message to the recoverer device 11.

Then, the operations in steps S32 through S35 are performed when the key recovery information distribution device determines that an authentication response has been received from the recoverer device. That is, an authentication response message is transmitted to the authentication information interchange unit 12c. The authentication information interchange unit 12c transmits the authentication response message to the communications unit 12f. The communications unit 12f transmits the authentication response message to the key recovery device 13.

The operations in steps S36 through S40 are performed when the key recovery information distribution device determines that key information (K1, K2, K3, . . . , Kn) has been received from the key recovery device. That is, the control unit 12e stores the key information. It is determined whether or not the subsequent key recovery information for another key recovery device has been transmitted. If yes, the key recovery information is transmitted to the control unit 12e, and the above described process to be performed when the key recovery information has been received is started. If there is no subsequent key recovery information, then the key information is transmitted to the communications unit 12f, and the communications unit 12f transmits the key information to the communications unit 11f in the recoverer device 11. If the received information is not key information or any of the above described information, an error process is performed (step S41).

Figure 6:
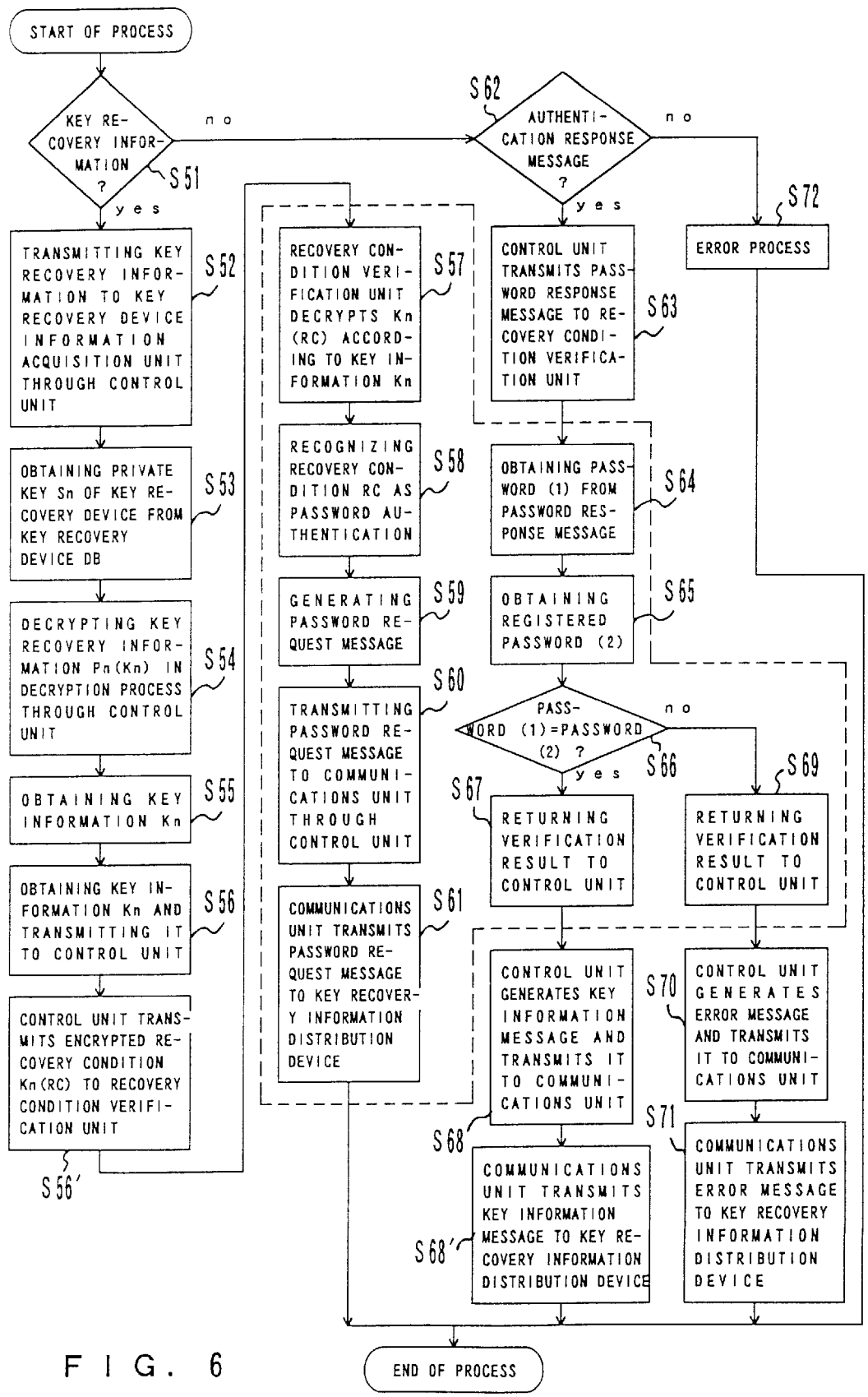
FIG. 6 is a flowchart showing the operations of the key recovery device according to the embodiment shown in FIG. 2.

FIG. 6 is a flowchart showing the operations of the key recovery device 13 according to the embodiment shown in FIG. 3. The operations in steps S51 through S61 are performed when a key recovery device receives key recovery information. That is, the key recovery information is transmitted to the key information acquisition unit 13a through the control unit 13d. A private key Sn of the key recovery device 13 is obtained from a key recovery device database device not shown in FIG. 3. Key recovery information Pn(Kn) is decrypted in a decryption process through the control unit 13d. The control unit 13d transmits the encrypted recovery condition Kn(RC) to the recovery condition verification unit 13b. The recovery condition verification unit 13b decrypts the Kn(RC) according to the key information Kn. The recovery condition verification unit 13b recognizes that the recovery condition RC refers to a password in a password, an ID, and text data.

Next, a password request message is generated, and transmitted to the communications unit 13e through the control unit 13d. The communications unit 13e transmits the password request message, that is, an authentication request, to the key recovery information distribution device 12.

Unless the data received by a key recovery device is key recovery information, then it is determined whether or not the data is an authentication response message from a recoverer device. If yes, the operations in steps S62 through S71 are performed. That is, the control unit 13d transmits a password response message to the recovery condition verification unit 13b. A password (1) is obtained from the password response message, and a registered password (2) is obtained. It is determined whether or not the passwords (1) and (2) match each other. If yes, the verification result is returned to the control unit 13d. The control unit 13d generates a key information message and transmits it to the communications unit 13e. The communications unit 13e transmits the key information message to the key recovery information distribution device 12, that is, K1, K2, . . . , Kn are transmitted to the key recovery information distribution device 12. When the passwords (1) and (2) do not match each other, the authentication response message from the recoverer device 11 is not correct in response to the authentication request from the key recovery device 13. Therefore, since the key recovery device 13 cannot transfer key information to a recoverer, the verification result is returned to the control unit 13d, and the control unit 13d generates an error message and transmits it to the communications unit 13e. The communications unit 13e transmits the error message to the key recovery information distribution device 12, and the error message is furthermore transferred to the recoverer device 11.

When a key recovery device does not receive an authentication response message or any of the above described messages, the process terminates as an error process (step S72).

According to the present invention, the information such as the ID of a key recovery device and an access destination, contained in key recovery information can be obtained through a key recovery information analysis unit and a key recovery device information acquisition unit.

Consequently, even if there is no information about a key recovery device, a recoverer device can communicate with the key recovery device not directly but through a key recovery information distribution device, and can obtain a data key used when data was encrypted.

Furthermore, using an authentication information interchange unit 12c of a key recovery information distribution device 12, a key recovery device 13 can transmit an authentication request to a recoverer device 11 through an authentication information interchange unit 12c. Therefore, the recoverer can be directly authenticated.

As a result, an interactor to a key recovery service can be prevented from illegally obtaining a data key.

Described below is the entire operation of an embodiment of the present invention shown in FIG. 3.

STEP 101: Using the key recovery request unit 11a of the recoverer device 11, a recoverer specifies an encrypted original sentence to be recovered.

STEP 102: The encrypted sentence is transmitted from the key recovery request unit 11a to the key recovery information acquisition unit 11g through a control unit 11e.

STEP 103: The key recovery information acquisition unit 11g obtains key recovery information from the encrypted sentence. The key recovery information according to the present invention is described on pages 4 through 197 in the 'File Key Encryption using Public Key Encryption' by Kurita and Miyauchi (published in the 47th national meeting Information Processing Society of Japan). The following explanation is based on the key recovery information (1) P(K), K(RC) obtained by combining the P(K) obtained by encrypting the data key K using the public key P of the key recovery device with the K(RC) obtained by encrypting the recovery condition RC using the key K. According to the key recovery information (1) indicated by the P(K) and K(RC), key recovery information (2) P1 (K1), K1 (RC1), P2 (K2), K2 (RC2), . . . , Pn (Kn), Kn (RCn) (parallel method) are obtained as key recovery information for which the authority of the key recovery device is distributed in parallel, and key recovery information (3) Pn((Pn−1, . . . , P3 (P2 (P1 (K), K (RCd), KC2 (RC2)), KC3 (RC3)) . . . ), KCn (RCn)) (serial method) are obtained as key recovery conditions in which the authority of the key recovery device is put in order or sequence. There can be a parallel-serial method in which the key recovery information in the parallel method is inserted into the RC and Kn portions in the serial method, and the key recovery information in the serial method is inserted into the Kn portion in the parallel method.

STEP 104: The key recovery information obtained by the key recovery information acquisition unit 11g is passed to the communications unit 11f through the control unit 11e, and is transmitted to the key recovery information distribution device 12. A communications means can be a standard protocol such as an HTTP protocol, etc., or can be a protocol specific to a key recovery system. The communications between the key recovery information distribution device 12 and the key recovery device 13 can be encrypted in a common method as shown in the "ISO 1170-3 Information technology-Security techniques-Key management Part 3: Mechanisms using asymmetric techniques" using the encryption process units 11d and 12d, the control units 11e and 12e, the communications units 11f and 12f.

STEP 105: The key recovery information received by the communications unit 12f of the key recovery information distribution device 12 is transmitted to the control unit 12e.

STEP 106: It is transmitted from the control unit 12e to the key recovery information analysis unit 12a.

STEP 107: The key recovery information analysis unit 12a identifies the type of the key recovery information. If the authority is distributed, the key recovery information of each key recovery device is extracted. In the case of the above described key recovery information (2) (parallel method), the information is Pn (Kn) and Kn (RCn). In the case of the above described key recovery information (3) (serial method), the information cannot be distributed to each key recovery device. Therefore, the key recovery information is used as assigned to the first key recovery device.

STEP 108: The key recovery information selected in STEP 105 is transmitted to the control unit 12e. The control unit 12e obtains a method for accessing the key recovery device in the key recovery information acquisition unit 12b. The key recovery information acquisition unit 12b can store the information about a key recovery device as a database, or can extract it from the header of the key recovery information. The position where the key recovery device is accessed can be indicated by a URL, for example, http://kr.ro.jp/, or can be indicated by an identification name specified by an ITU=TX.500 such as /C=jp/o=KR/, etc.

STEP 109: The control means transmits the key recovery information and the access method to the communications unit 12f. The communications unit 12f transmits the key recovery information to the key recovery device 13 according to the access method. The communications means can be a standard protocol such as an HTTP protocol, etc., or can be a protocol specific to the key recovery device. The communications between the key recovery information distribution device 12 and the key recovery device 13 can be encrypted by a common method as indicated by 'ISO 1170-3 Information technology-Security techniques-Key management Part 3: Mechanisms using asymmetric techniques' by the encryption process units 12d and 13c, the control units 12e and 13d, and the communications units 12f and 13e.

STEP 110: The key recovery device 13 receives the key recovery information through the communications unit 13e. The communications unit 13e transmits the key recovery information to the key information acquisition unit 13a through the control unit 13d.

STEP 111: The key information acquisition unit 13a decrypts the key recovery information Pn(K) using the private key Sn of the key recovery device 13 through the control unit 13d and the encryption process unit 13c, and obtains the key information Kn. When the key recovery information in the parallel method is used, one of the keys obtained by distributing the key K for security is obtained. When the key recovery information in the serial method is used, the Kn−1 and the Kn (RC) encrypted by the public key Pn−1 of the subsequent key recovery device can be obtained.

STEP 112: The key information obtained by the key information acquisition unit 13a is transmitted to the recovery condition verification unit 13b through the control unit 13d.

STEP 113: The recovery condition verification unit 13b decrypts the recovery condition RC according to the key information using the encryption process unit 13c through the control unit 13d.

STEP 114: The key recovery condition verification unit 13b identifies the type of the decrypted recovery condition. A recovery condition prompts a password from a recoverer and authorizes the recoverer if the recoverer can return a registered password. Another recovery condition is written in the form of free text. A further recovery condition is represented by a question to a recoverer and an answer. The question is sent to the recoverer and the recoverer answers the question. A further recovery condition can be an electronic signature in the well-known public key method. According to the present embodiment, authentication using a password is required as a recovery condition.

STEP 115: The recovery condition verification unit 13b generates a password request message.

STEP 116: The password request message is transmitted to the communications unit 12f in the key recovery information distribution device 12 through the control unit 13d and communications unit 13e.

STEP 117: It is transmitted from the communications unit 12f to the control unit 12e.

STEP 118: The control unit 12e transmits the password request message to the authentication information interchange unit 12c when it recognizes the received information as a password request message.

STEP 119: The authentication information interchange unit 12c transmits the password request message to the communications unit 12f through the control unit 12e. The communications unit 12f transmits the password request message to the communications unit 11f in the recoverer device 11.

STEP 120: The communications unit 11f transmits the password request message to the authentication response unit 11b through the control unit 11e.

STEP 121: The authentication response unit 11b prompts the recoverer to enter a password.

STEP 122: The recoverer inputs a password at the request from the authentication response unit 11b.

STEP 123: The authentication response unit 11b generates a password response message based on the password input by the recoverer.

STEP 124: The authentication response unit 11b transmits the password response message to the communications unit 11f through the control unit 11e.

STEP 125: The communications unit 11f transmits the password response message to the authentication information interchange unit 12c through the control unit 12e.

STEP 126: The authentication information interchange unit 12c transmits the password response message to the communications unit 12f using the control unit 12e.

STEP 127: The communications unit 12f transmits the password response message to the communications unit 13e.

STEP 128: The communications unit 13e transmits the password response message to the recovery condition verification unit 13b through the control unit 13d.

STEP 129: The recovery condition verification unit 13b verifies the password in the password response message, and transmits the result to the control unit 13d.

STEP 130: The control unit 13d transmits to the communications unit 13e a key information message if the password is verified and an error message if the password is not verified.

STEP 131: The communications unit 13e transmits the key information message or the error message to the communications unit 12f.

STEP 132: The communications unit 12f transmits the key information message or the error message to the control unit 12e.

STEP 133: If the control unit 12e receives the error message, then it transmits the error message to the control unit 11e using the communications units 12f and 11f, and terminates the process.

If the control unit 12e receives a key information message, it obtains the key recovery information for the subsequent key recovery device according to the processes in STEPS 105 through 131. The process is continued for the number of the key recovery devices to which the authority is distributed.

STEP 134: When the process in STEP 132 is completed, the control unit 12e transmits the key information to the communications unit 11f through the communications unit 12f.

STEP 135: The communications unit 11f transmits the key information to the key recovery unit 11c through the control unit 11e.

STEP 136: The key recovery unit 11c recovers a data key according to the key information. In the parallel method, the key is recovered from the key information for which the authority is distributed for security. In the serial method, the key information is the key itself.

STEP 137: The key recovery unit 11c transmits the data key to the control unit 11e.

STEP 138: The control unit 11e generates a key response message based on the data key, and transmits the message to the communications unit 11f.

STEP 139: The communications unit 11f transmits a key response message to the control unit 11e, and the control unit 11e informs the recoverer that the key has been recovered. Thus, the process terminates.

Figure 7:
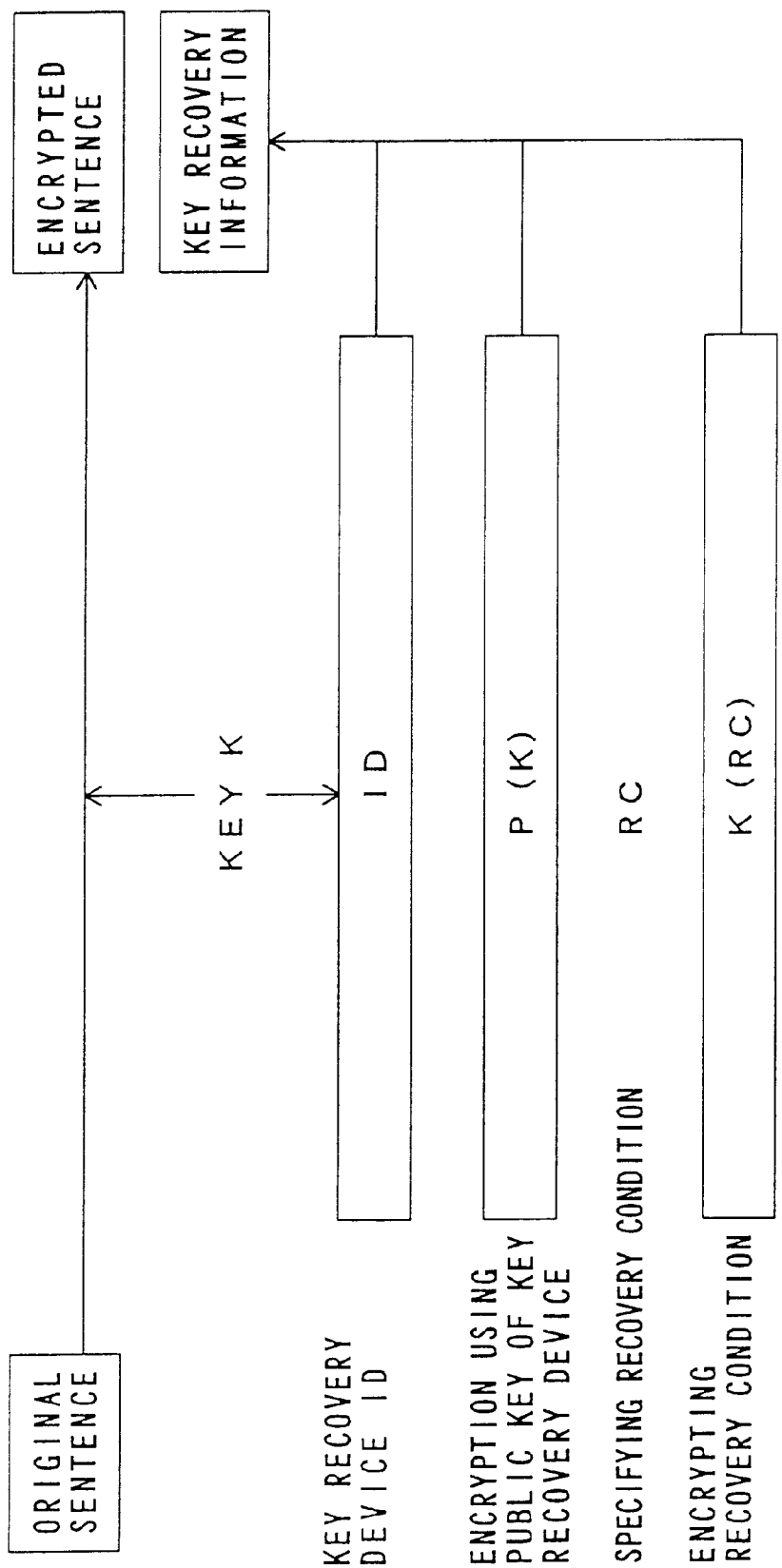
FIG. 7 shows a common format of the key recovery information used in the embodiments according to the present invention.

FIG. 7 shows a basic format of the key recovery information used in the present invention. That is, an original sentence (data) is encrypted using a data key K, and key recovery information is added to the encrypted sentence and they are stored in the recoverer device. The data key K is encrypted using an ID and a public key P of the key recovery device. The P(K) and the recovery condition RC are used as, for example, a password to encrypt a recovery condition using the K into K(RC). That is, the key recovery information contains an ID, a P(K), and a K(RC), and is added to an encrypted sentence. If a recoverer has lost his or her private key for use in decrypting his or her own public key which is used in encrypting the data key, then a key recovery device 13 specified by the predetermined key recovery device ID through the key recovery information distribution device 12 is accessed according to the key recovery information ID, P(K), and K(RC) added to the encrypted sentence. When, for example, a password authentication request is issued by the key recovery device 13 as a recovery condition contained in the key recovery information, the recoverer device 11 inputs a password so that an authentication process can be performed directly between the key recoverer and the key recovery device 13. If the recoverer can be authenticated, the K is transferred from the key recovery device 13 to the recoverer device 11 directly or through the key recovery information distribution device 12. The recoverer device 11 decrypts the stored encrypted sentence using the K and obtains the original sentence (data).

Figure 8:
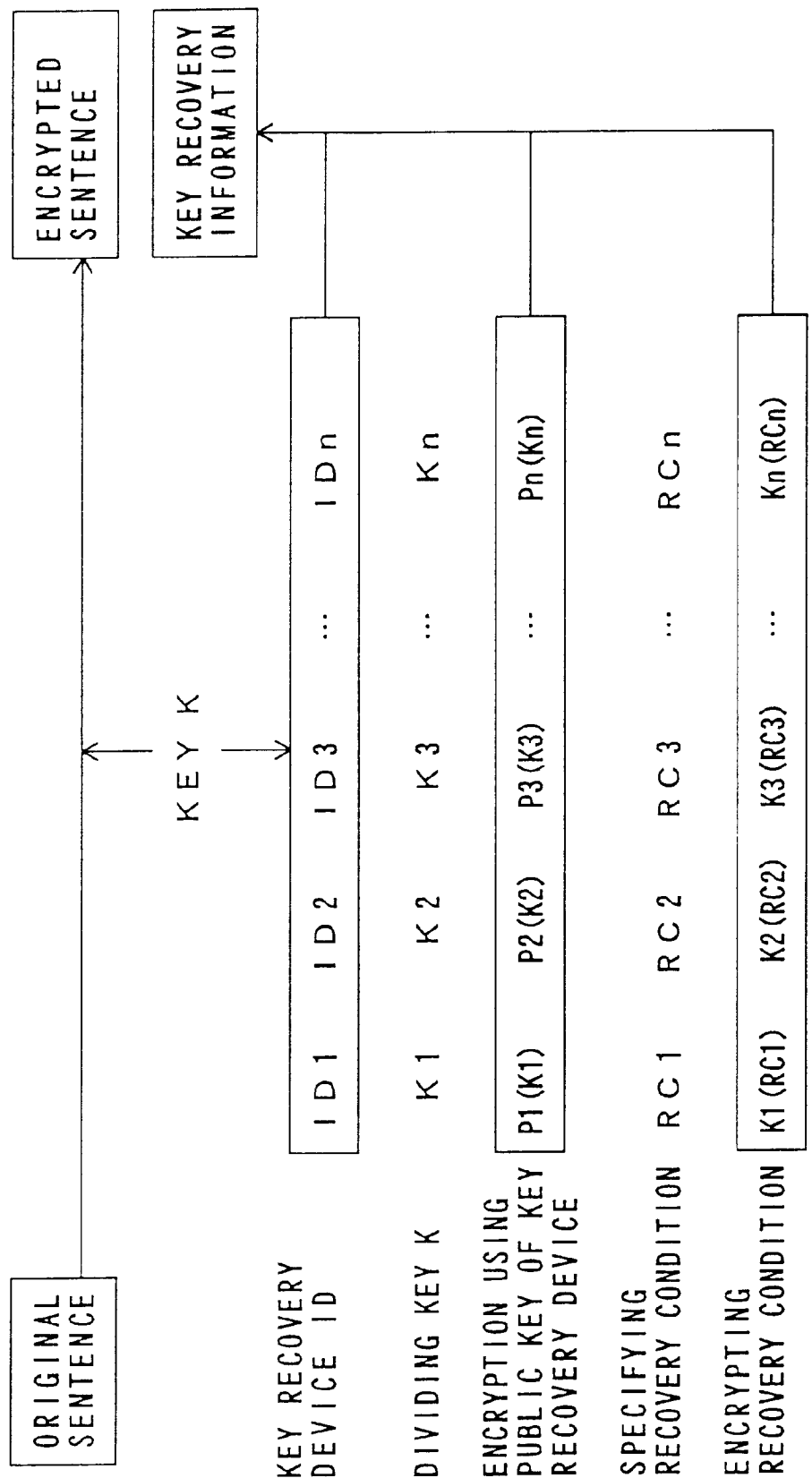
FIG. 8 shows the format indicating the key recovery information to which the authority is distributed by the parallel method used in the embodiments of the present invention.

FIG. 8 shows the key recovery information for which the authority is distributed in the parallel method.

In this case, there are a plurality of key recovery devices 13, and key recovery devices 13 are respectively assigned ID1, ID2, ID3, . . . , IDn. The key K is divided into K1, K2, K3, . . . , Kn. Using the public keys P1, P2, P3, . . . , Pn of the key recovery devices 13, the divided keys K1, K2, K3, . . . , Kn are encrypted. The recovery conditions RC1, RC2, RC3, and RCn indicating the authentication condition specified by an encrypter are respectively encrypted using the keys K1, K2, K3, . . . , Kn to generate K1(RC1), K2(RC2), K3(RC3), . . . , Kn(RCn).

Thus, if the authority is divided into a plurality of key recovery devices 13 according to the key recovery information generated as described above in the parallel method, the key is recovered as follows. The method of accessing the key recovery device 13 is obtained from ID1. P1(K1) K1(RC1) is transmitted to the key recovery device ID1. P1(K1) is decrypted using the private key S1, and K1(RC1) is decrypted using K1. According to RC1, the recoverer is authenticated using, for example, a password. Then, as described later, the session key Ks is shared between the recoverer device 11 and the key recovery device 13. Using the session key Ks, the recoverer is authenticated by encrypting an authentication request or an authentication response message. Thus, the recoverer device 11 and the key recovery device 13 can directly communicate with each other for authentication. That is, the key recovery information distribution device 12 does not relate to the authentication and therefore cannot perform the authentication process for a recoverer or obtain a data key. Then, K1 is multiplied by Ks and the product is passed to the recoverer device. Then, the similar process is performed on the ID2. Thus, the following equation is obtained.

$$K1 \oplus K2 \ldots \oplus Kn = K$$

Figure 9:
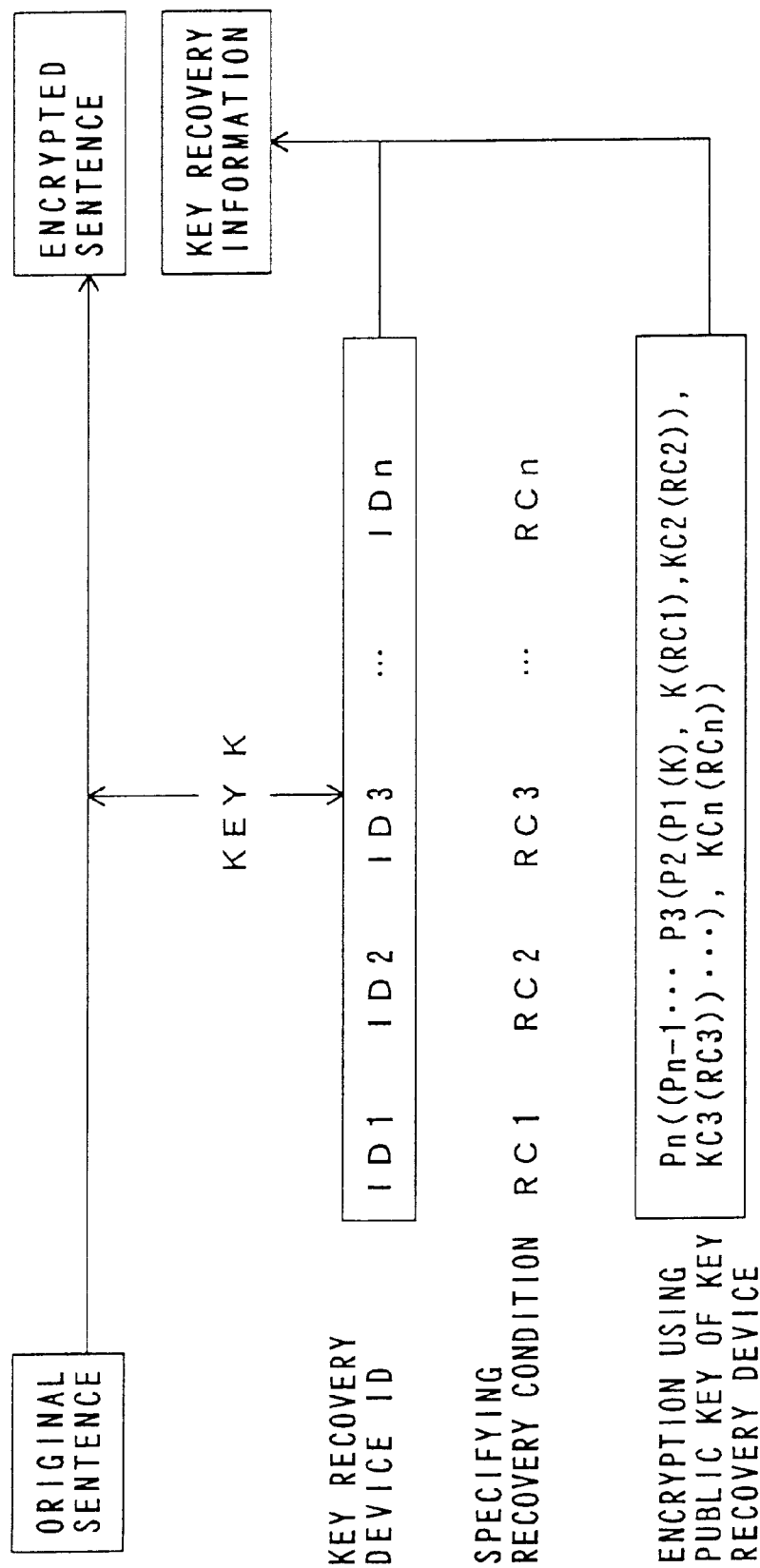
FIG. 9 shows the format of the key recovery information for which the authority is distributed by the sequential method used in the embodiments of the present invention.
Figure 10:
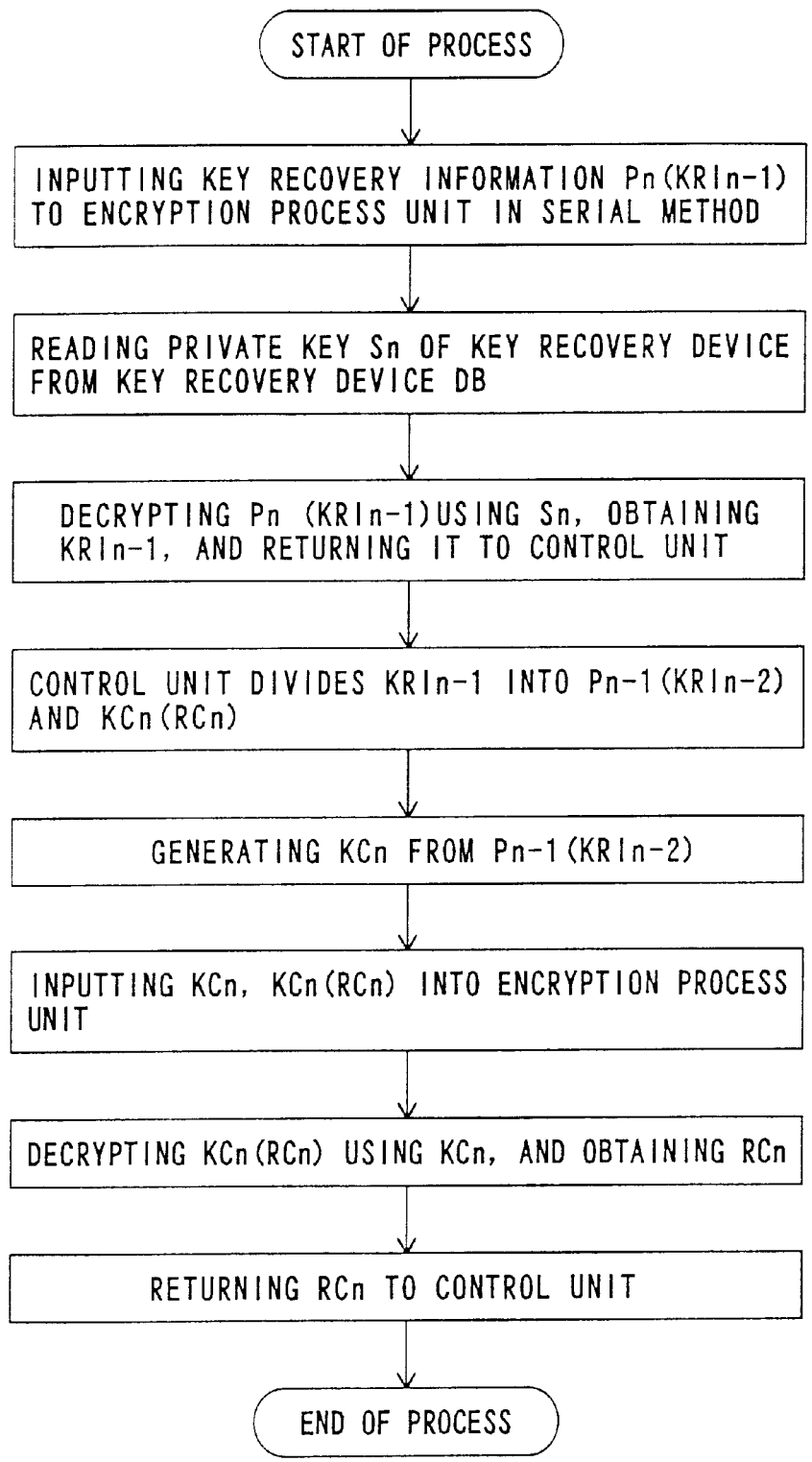
FIG. 10 is a flowchart of the key recovery information in the sequential method in which the authority of each key recovery device is assigned in order.

FIG. 9 is a flowchart of the serial method indicating the key recovery information for which the authority is distributed in the serial method, that is, the key recovery information in the serial method in which the authority of the key recovery device is put in order. The serial method is described below by referring to FIGS. 9 and 10. The 'KRIn−1' shown in FIG. 10 equals the '((Pn−1 . . . P3(P2 (P1(K), K(RC1), KC2(RC2))KC3(RC3)) . . . )KCn(RCn)))'.

If the P3 is removed from the representation shown in FIG. 9, 'P2(P1(K),K(RC1), KC2(RC2)), KC3(RC3)' is obtained. Then, it is divided into 'P2(P1(K), K(RC1), KC2 (RC2))' and 'KC3(RC3)'. The 'P2(P1(K), K(RC1), KC2 (RC2))' is multiplied by, for example, a hash function to generate KC3. Then, the RC3 is decrypted by the KC3. Thus, the key recovery device 13 performs an authentication process. If the recoverer can be authenticated, then the 'P2(P1(K), K(RC1), KC2(RC2))' is transmitted to the key recovery information distribution device 12. At this time, the session key Ks is not used. Then, using ID2, the access method is obtained to transmit the 'P2(P1(K), K(RC1), KC2(RC2))' is transmitted to the key recovery device ID2. The S2 decrypts the 'P2(P1(K), K(RC1), KC2(RC2))'. The KC2 is obtained using a hash from the P1(K),K(RC1). The KC2(RC2) is decrypted by the KC2 to obtain the RC2. The authentication process is performed by the RC2. If the recoverer is authenticated, P1(K), K(RC1) is transmitted to the key recovery information distribution device 12. Then, an access method is obtained using the ID1. The P1(K), K(RC1) is transmitted to the key recovery device ID1. Then, the P1(K) is decrypted using the S1 to obtain K. The K(RC1) is decrypted using the K. Thus, the RC1 performs an authentication process. If the recoverer is successfully authenticated, then the K is transmitted to the recoverer device 11 through the key recovery information distribution device 12. At this time, the K is decrypted using the Ks. The key recovery devices 13 have been respectively assigned ID1, ID2, ID3, . . . , IDn, and respective recovery conditions RC1, RC2, RC3, . . . RCn like the format in the parallel method.

The above described embodiment is described based on the key recovery information. It is obvious that the authentication according to the present invention can be performed on other formats of key recovery information directly between a recoverer device and a key recovery device.

FIG. 11 is a table provided in the key recovery information distribution device 12. In this table, the name of a key recovery device 13, an access address, and the protocol of the access are stored in a record. Thus, the ID of a key recovery device 13 is obtained from the key recovery information. A predetermined key recovery device 13 indicated by the key recovery information can be accessed by referring to the table shown in FIG. 11 based on the ID. The operations are performed in steps S140 through S148.

Figure 12:
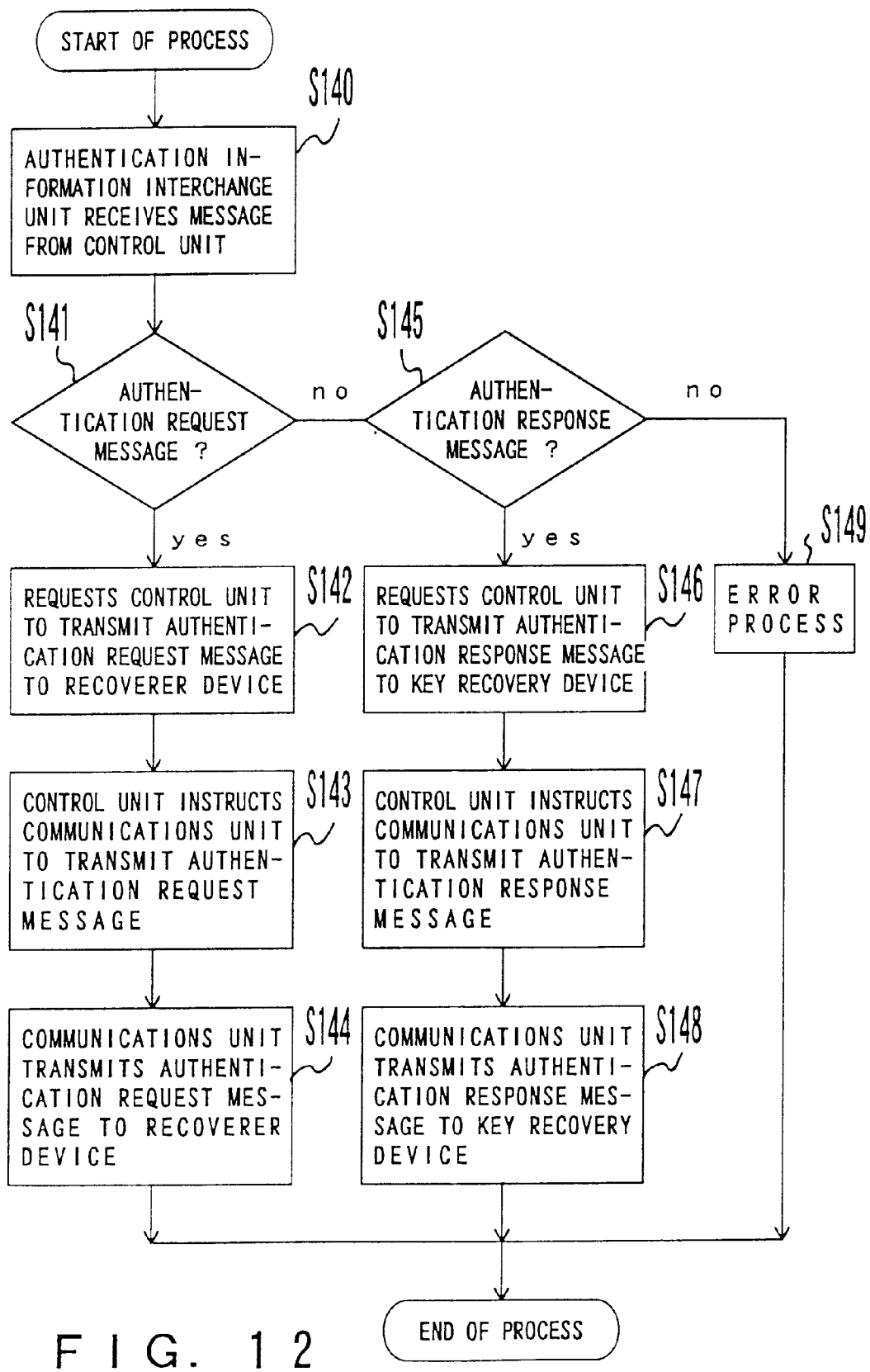
FIG. 12 is a flowchart showing the operations of the authentication interchange unit in the key recovery information distribution device shown in FIG. 2.

FIG. 12 is a flowchart showing the authentication information interchange unit 12c of the key recovery information distribution device 12. After starting the process, the authentication information interchange unit 12c receives a message from the control unit 12e during the authentication process (step S140). If it is an authentication request message (step S141), the authentication information interchange unit 12c requests the control unit 12e to transmit an authentication request message to the recoverer device 11 (step S142). Then, the control unit 12e instructs the communications unit 12f to transmit the authentication request message (step S143), and the communications unit 12f transmits the authentication request message to the recoverer device 11 (step S144). On the other hand, if it is not an authentication request message, it is determined whether or not the message is an authentication response message (step S145). If yes, the authentication information interchange unit 12c requests the control unit 12e to transmit an authentication response message to the key recovery device 13 (step S146). The control unit 12e instructs the communications unit 12f to transmit the authentication response message (step S147), and the communications unit 12f transmits an authentication response message to the key recovery device 13 (step S148). If the received message is not an authentication response message or any of the above described messages, then an error process is performed (step S149).

The control flowchart of the recovery condition verification unit 13b of the key recovery device 13 shows the steps of matching the password indicated by the dotted line shown in FIG. 6. Therefore, the explanation is omitted here.

Figure 13:
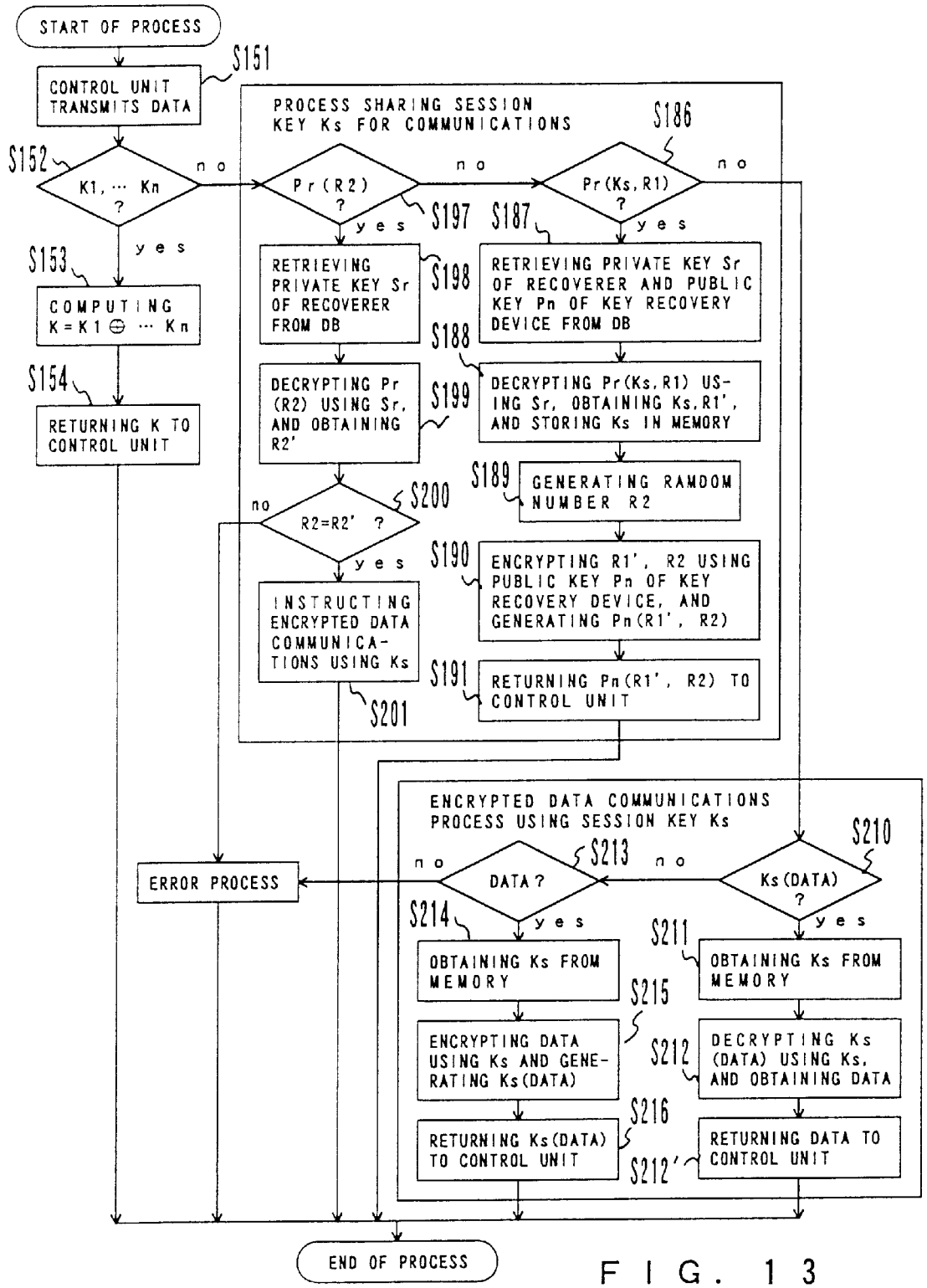
FIG. 13 is a flowchart showing the encryption process unit in the recoverer device shown in FIG. 2.
Figure 14:
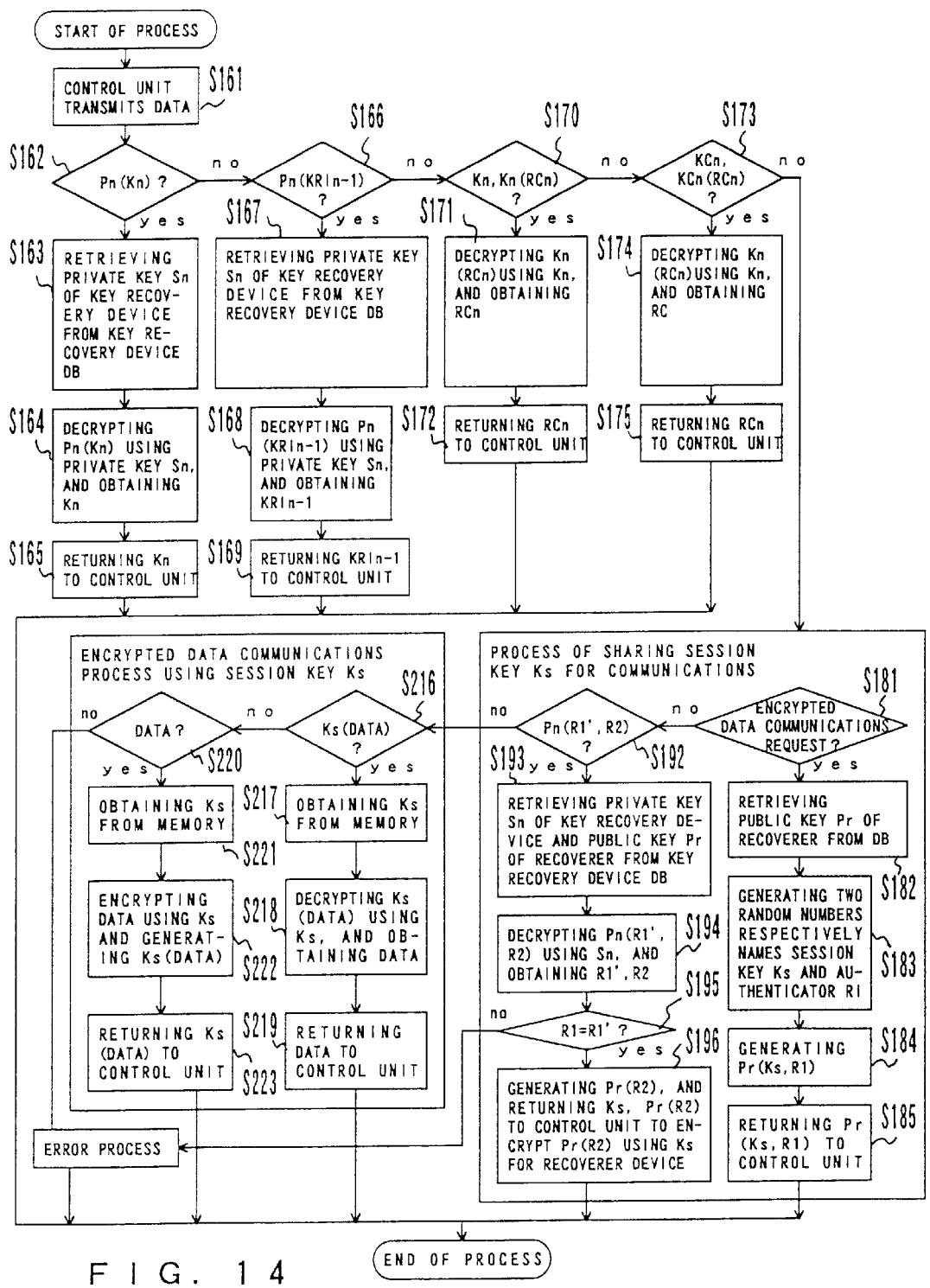
FIG. 14 is a flowchart showing the encryption process unit in the key recovery device according to the embodiment shown in FIG. 2.

Next, the flowcharts of the encryption process unit 11d in the recoverer device 11 and the encryption process unit 13c in the key recovery device 13 are described by referring to FIGS. 13 and 14, respectively.

In FIG. 13, when data is transmitted from the key recovery unit 11c, the encryption process unit 11d of the recoverer device 11 determines whether or not the data refers to K1, K2, K3, . . . , Kn (steps S151 and 152) when the key recovery information is composed according to the parallel method. If yes, an exclusive logical sum of each of the K1 through Kn is computed, the key K is obtained, and the K is returned to the key recovery unit 11c (steps S153 and S154). If the data from the key recovery unit 11c is not K1, K2, K3, . . . , Kn, then a process of sharing the session key Ks is performed for communications, or a decryption communications process is performed using the session key Ks.

FIG. 14 shows the operation of the encryption process unit 13c of the key recovery device 13. When data is transmitted from the control unit 13d (step S161), it is determined whether or not the data is Pn (Kn). If yes, the key information in the key recovery information is designed in the parallel method. Then, the operations are performed in steps S162 through S165. That is, the private key of the key recovery device 13 is retrieved from the database of the key recovery device 13, the Pn(Kn) is decrypted using the private key Sn of the key recovery device 13 to obtain Kn. The Kn is returned to the control unit 13d.

If the data is not Pn(Kn), the key information in the key recovery information is designed in the serial method. In this case, the operations are performed in steps S166 through S169, and it is determined whether or not the data is Pn(KRIn−1). 'KRIn−1' refers to the key recovery information of the subsequent key recovery device. If the determination is 'YES', the private key Sn of the key recovery device 13 is retrieved from the database of the key recovery device 13. The Pn(KRIn−1) is decrypted using the private key Sn of the key recovery device 13. Then, the IRIn−1 is returned to the control unit 13d.

If the data is not the key information in the key recovery information, then it is determined whether or not the data refers to a recovery condition in the parallel method (step S170 through S172). That is, it is determined whether or not it refers to Kn,Kn(RCn). If yes, the Kn decrypts the Kn(RCn). The RCn is obtained, and the RCn is returned to the control unit 13d. Furthermore, if the data does not refer to a key recovery condition in the parallel method, either, then it is determined whether or not the data refers to a key recovery condition in the serial method (steps S173 through S175). That is, it is determined whether or not the data refers to KCn,KCn(RCn). If yes, the Kn decrypts the Kn(RCn) to obtain the RCn. Then, the RCn is returned to the control unit 13d. If the data does not refer to a key recovery condition in the serial method, then control is passed to the session key Ks sharing process and the encrypted data communications process performed using the session key Ks to establish the subsequent communications.

Next, the session key Ks sharing process for communications between a recoverer device 11 and a key recovery device 13 and the encrypted data communications process performed using a session key Ks are described below by referring to FIGS. 13 and 14.

The session key Ks sharing process is performed using a public key Pr of a recoverer and a public key Pn of a key recovery device 13. Then, data is encrypted using the session key Ks and transmitted and received between the recoverer device 11 and the key recovery device 13. In the encrypted data communications process, the data transmitted and received in the communications is referred to as DATA, and encrypted/decrypted by the Ks. Thus, the two methods shows the contrast.

In the session key Ks sharing process, the following steps are followed.

1. The key recovery device 13 generates and transmits a Pr (Ks, R1).
2. The recoverer device 11 decrypts the Pr (Ks, R1), and obtains Ks, R1'.
3. The recoverer device 11 encrypts the R1' and a random number R2 using the Pn of the key recovery device 13 and generates Pn (R1', R2). The Pn (R1', R2) is transmitted.
4. The key recovery device decrypts the Pn (R1', R2), and obtains R1', R2. If the R1 generated by the key recovery device 13 is compared with the decrypted R1', and they match each other, then the recoverer is authenticated and the Ks is used in the encrypted data communications.
5. The key recovery device decrypts and transmits the R2 obtained in 4 above as Pr (R2).
6. Assuming that the information R2' is obtained by decrypting the Pr (R2) by the recoverer device 11 and that the R2' matches the R2 generated by the recoverer device 11, the key recovery device 13 can be authenticated and the Ks is used in the encrypted data communications.

To be more practical, in steps S181 through S185 in the flowchart of the encryption process unit 13c in the key recovery device 13 shown in FIG. 14, it is determined whether or not the received data is an encrypted data communications request. If yes, the public key Pr of the recoverer is retrieved from the database DB. Two random numbers are generated and named a session key Ks and an authenticator R1. Then, Pr (Ks, R1) is generated and the Pr (Ks, R1) is returned to the control unit 13d. The Pr (Ks, R1) is transmitted from the key recovery device 13 to the recoverer device 11 through the key recovery information distribution device 12.

Described below are the processes in steps S186 through S191 shown in the flowchart of the encryption process unit 11d in the recoverer device 11 shown in FIG. 13. It is determined whether or not the received data is Pr (Ks, R1). If yes, the private key Sr of a recoverer and the public key Pn of the key recovery device are retrieved from the database. The Pr (Ks, R1) is decrypted using the Sr to obtain Ks and R1'. The Ks is stored in the memory. A random number R2 is generated, and the R1, R2 is encrypted using the public key Pn of the key recovery device to obtain Pn (R1', R2). The Pn (R1', R2) is returned to the control unit 11c.

Described below are the processes in steps S192 through S196 shown in the flowchart of the key recovery device 13 shown in FIG. 14. It is determined whether or not the received data is Pn (R1', R2). If yes, the private key Sn of the key recovery device and the public key Rr of a recoverer are retrieved from the DB of the key recovery device. Then, the Pn (R1, R2) is decrypted using the Sn to obtain R1' and R2. Then, it is determined whether or not R1=R1' to confirm that the recoverer is authenticated. If yes, Pr (R2) is generated, and Ks and Pr (R2) are returned to the control unit 13d and Pr (R2) is encrypted by Ks to be transmitted to the recoverer device 11.

Then, the steps S197 through S201 in the flowchart of the encryption process unit 11d of the recoverer device 11 shown in FIG. 13 are performed again through the key recovery information distribution device 12. It is determined whether or not the received data is Pr (R2). If yes, the private key Sr of the recoverer is retrieved from the database, and the Rr (R2) is decrypted using the Sr to obtain R2'. Then, it is determined whether or not R2=R2'. If yes, the recoverer device 11 is authenticated and an instruction to set encrypted data communications is transmitted to the control unit 11e. In the above described processes, the authentication is performed between the recoverer device 11 and the key recovery device 13, and the session key Ks is shared between the recoverer device 11 and the key recovery device 13.

Described below is the process of setting the encrypted data communications using the session key Ks in the recoverer device 11 by referring FIG. 13.

Data refers to, for example, a password request message, a password response message, and the data key information K1, K2, K3, . . . Kn.

In steps S210 through S212', it is determined whether or not the received data is Ks(DATA). If yes, the Ks is obtained from the memory. The Ks(DATA) is decrypted using the Ks, and the obtained data is returned to the control unit 11e. Then, it is determined whether or not the received data is DATA in steps S213 through S216. If yes, the Ks is obtained from the memory and the DATA is encrypted using the Ks to generate Ks(DATA). The Ks(DATA) is returned to the control unit 11e. That is, in the encryption process unit 11d in the recoverer device 11, the Ks(DATA) refers to the reception of an authentication request message or the key information K1, K2, K3, . . . , Kn. The DATA may refer to the transmission of an authentication response message.

In the key recovery device 13, the encrypted data communications process using a session key Ks is performed in steps S216 through S223 in the flowchart shown in FIG. 14. Since the difference between Ks (DATA) and DATA is similar in the encrypted data communications process, the detailed explanation is omitted here. However, in the key recovery device 13, Ks (DATA) indicates YES when a password response message is received, and DATA indicates YES when a password request message is transmitted.

As described above, Ks (DATA) are transmitted between the recoverer device 11 and the key recovery device 13. The authentication between the key recovery device 13 and the recoverer device 11 is performed by sharing the session key Ks between them and on the other hand, the session key Ks is not shared by the key recovery information distribution device 12. Thus, the information distribution device cannot participate in the authentication. Thus, the recoverer is directly authenticated between the recoverer device 11 and the key recovery device 13.

Figure 15:
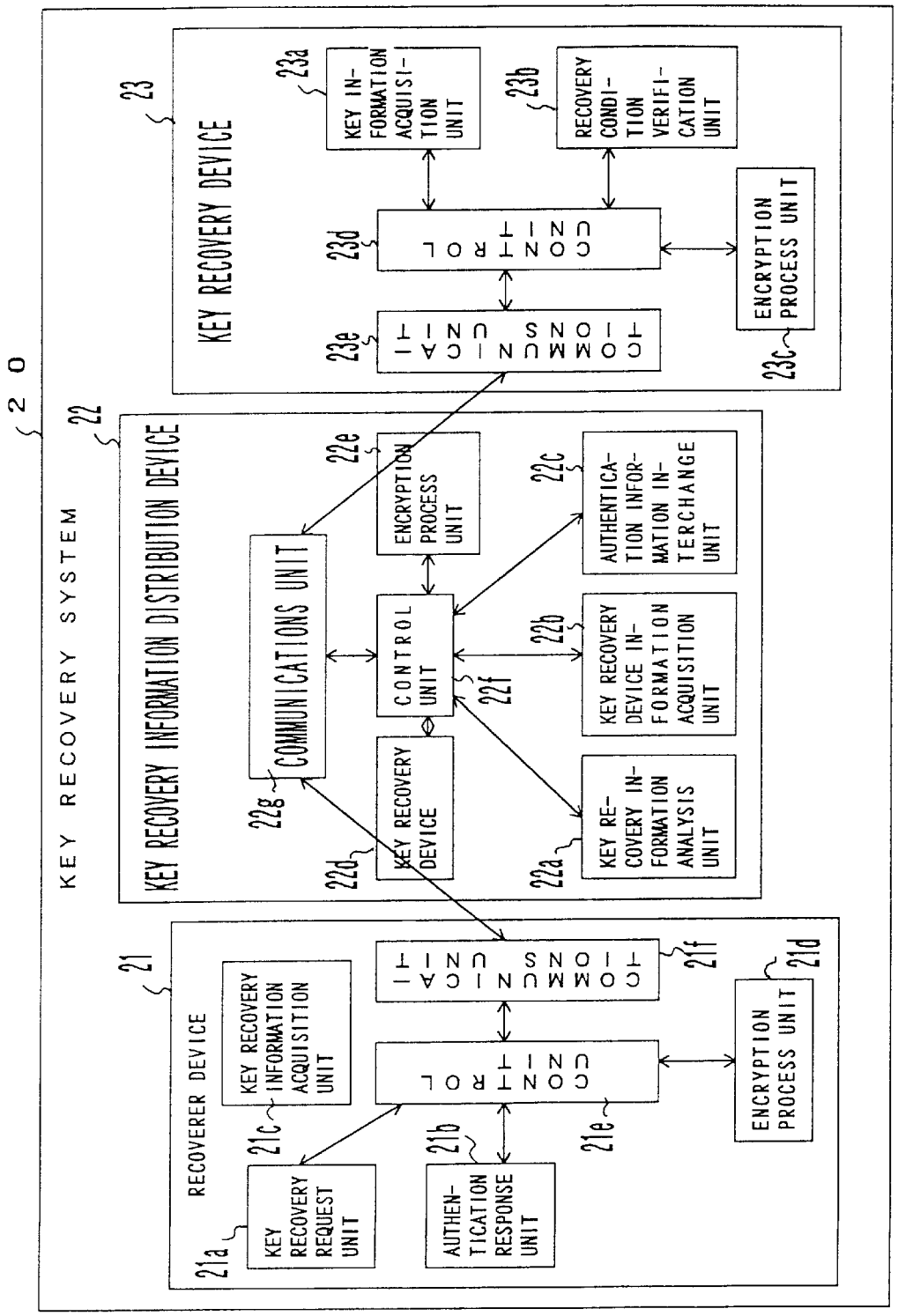
FIG. 15 is a block diagram showing a further embodiment of the present invention.

FIG. 15 shows another embodiment of the present invention in which a key recovery unit 22d is provided in a key recovery information distribution device 22.

A key recovery system 20 comprises a recoverer device 21, a key recovery information distribution device 22, and a key recovery device 23.

The recoverer device 21 comprises a key recovery request unit 21a, an authentication response unit 21b, a key recovery information acquisition unit 21c, an encryption process unit 21d, a control unit 21e, and a communications unit 21f.

The key recovery information distribution device 22 comprises a key recovery information analysis unit 22a, a key recovery device information acquisition unit 22b, an authentication information interchange unit 22c, a key recovery unit 22d, an encryption process unit 22e, a control unit 22f, and a communications unit 22g.

The key recovery device 23 comprises a key information acquisition unit 23a, a recovery condition verification unit 23b, an encryption process unit 23c, a control unit 23d, and a communications unit 23e.

STEP 301: A recoverer specifies an encrypted original sentence to be recovered using the key recovery request unit 21a in the recoverer device 21.

STEP 302: The encrypted sentence is transmitted from the key recovery request unit 21a to the key recovery information acquisition unit 21c through the control unit 21e.

STEP 303: The key recovery information acquisition unit 21c obtains key recovery information from the encrypted sentence. The key recovery information according to the present embodiment is described by Kurita and Miyauchi in 'File Key Encryption using public key encryption' (47th National Meeting of Information Processing Society, on pages 4–197). The explanation is based on the key recovery information (1) P (K), K (RC) obtained by combining the P (K) obtained by encrypting the data key K using the public key P of the key recovery device with the K (RC) obtained by encrypting the recovery condition RC using the key K. According to the key recovery information (1) indicated by the R(K) and K(RC), the key recovery information (2) P1 (K1), K1 (RC1), P2 (K2), K2 (RC2), . . . , Pn (Kn), Kn (RCn) (parallel method) are obtained as key recovery information for which the authority of the key recovery device is distributed in parallel, and key recovery information (3) Pn((Pn−1, . . . , P3 (P2 (P1 (K), K (RC1), KC2 (RC2)), KC3 (RC3)) . . . ), KCn (RCn)) (serial method) are obtained as key recovery conditions in which the authority of the key recovery device is put in order or sequence. There can be a parallel-serial method in which the key recovery information in the parallel method is inserted into the RC and Kn portions in the serial method, and the key recovery information in the serial method is inserted into the Kn portion in the parallel method.

STEP 304: The key recovery information obtained by the key recovery information acquisition unit 21c is passed to the communications unit 21f through the control unit 21e, and is transmitted to the key recovery information distribution device 22. A communications means can be a standard protocol such as an HTTP protocol, etc., or can be a protocol specific to a key recovery system. The communications between the key recovery information distribution device 22 and the key recovery device 23 can be encrypted in a common method as shown in the "ISO 1170-3 Information technology-Security techniques-Key management Part 3: Mechanisms using asymmetric techniques" using the encryption process units 21d and 22e, the control units 21e and 22f, the communications units 21f and 22g.

STEP 305: The key recovery information received by the communications unit 22g of the key recovery information distribution device 22 is transmitted to the control unit 22f.

STEP 306: It is transmitted from the control unit 22f to the key recovery information analysis device 22a.

STEP 307: The key recovery information analysis unit 22a identifies the type of the key recovery information. If the authority is distributed, the key recovery information of each key recovery device is extracted. In the case of the above described key recovery information (2) (parallel method), the information is Pn (Kn) and Kn (RCn). In the case of the above described key recovery information (3) (serial method), the information cannot be distributed to each key recovery device. Therefore, the key recovery information is used as assigned to the first key recovery device.

STEP 308: The key recovery information selected in STEP 305 is transmitted to the control unit 22f. The control unit 22f obtains a method for accessing the key recovery device 23 in the key recovery information acquisition unit 22b. The key recovery information acquisition unit 22b can store the information about a key recovery device as a database, or can extract it from the header of the key recovery information. The position where the key recovery device 23 is accessed can be indicated by a URL, for example, http://kr.ro.jp/, or can be indicated by an identification name specified by an ITU=TX.500 such as /C=jp/o=KR/, etc.

STEP 309: The control unit 22f transmits the key recovery information and the access method to the communications unit 22g. The communications unit 22g transmits the key recovery information to the key recovery device 23 according to the access method. The communications means can be a standard protocol such as an HTTP protocol, etc., or can be a protocol specific to the key recovery device 23. The communications between the key recovery information distribution device 22 and the key recovery device 23 can be encrypted by a common method as indicated by "ISO 1170-3 Information technology-Security techniques-Key management Part 3: Mechanisms using asymmetric techniques" by the encryption process units 22e and 23c, the control units 22f and 23d, and the communications units 22g and 23e.

STEP 310: The key recovery device 23 receives the key recovery information through the communications unit 23e. The communications unit 23e transmits the key recovery information to the key information acquisition unit 23a through the control unit 23d.

STEP 311: The key information acquisition unit 23a decrypts the key recovery information Pn(K) using the private key Sn of the key recovery device 23 through the control unit 23d and the encryption process unit 23c, and obtains the key information Kn. When the key recovery information in the parallel method is used, one of the keys obtained by distributing the key K for security is obtained. When the key recovery information in the serial method is used, the key recovery information for the subsequent key recovery device and the recovery condition encrypted by the key generated by the key recovery information can be obtained.

STEP 312: The key information obtained by the key information acquisition unit 23a is transmitted to the recovery condition verification unit 23b through the control unit 23d.

STEP 313: The recovery condition verification unit 23b decrypts the recovery condition RC according to the key information using the encryption process unit 23c through the control unit 23d.

STEP 314: The key recovery condition verification unit 23b identifies the type of the decrypted recovery condition. A recovery condition prompts a password from a recoverer and authorizes the recoverer if the recoverer can return a registered password. Another recovery condition is written in the form of free text. A further recovery condition is represented by a question to a recoverer and an answer. The question is sent to the recoverer and the recoverer answers the question. A further recovery condition can be an electronic signature in the well-known public key method. According to the present embodiment, authentication using a password is required as a recovery condition.

STEP 315: The recovery condition verification unit 23b generates a password request message.

STEP 316: The password request message is transmitted to the communications unit 22g in the key recovery information distribution device 22 through the control unit 23d and communications unit 23e.

STEP 317: It is transmitted from the communications unit 22g to the control unit 22f.

STEP 318: The control unit 22f transmits the password request message to the authentication information interchange unit 22c when it recognizes the received information as a password request message.

STEP 319: The authentication information interchange unit 22c transmits the password request message to the communications unit 22g through the control unit 22f. The communications unit 22g transmits the password request message to the communications unit 21f in the recoverer device 21.

STEP 320: The communications unit 21f transmits the password request message to the authentication response unit 21b through the control unit 21e.

STEP 321: The authentication response unit 21b prompts the recoverer to enter a password.

STEP 322: The recoverer inputs a password at the request from the authentication response unit 21b.

STEP 323: The authentication response unit 21b generates a password response message based on the password input by the recoverer.

STEP 324: The authentication response unit 21b transmits the password response message to the communications unit 21f through the control unit 21e.

STEP 325: The communications unit 21f transmits the password response message to the authentication information interchange unit 22c through the control unit 22f.

STEP 326: The authentication information interchange unit 22c transmits the password response message to the communications unit 22g using the control unit 22f.

STEP 327: The communications unit 22g transmits the password response message to the communications unit 23e.

STEP 328: The communications unit 23e transmits the password response message to the recovery condition verification unit 23b through the control unit 23d.

STEP 329: The recovery condition verification unit 23b verifies the password in the password response message, and transmits the result to the control unit 23d.

STEP 330: The control unit 23d transmits to the communications unit 23e a key information message if the password is verified and an error message if the password is not verified.

STEP 331: The communications unit 23e transmits the key information message or the error message to the communications unit 22g.

STEP 332: The communications unit 22g transmits the key information message or the error message to the control unit 22f.

STEP 333: If the control unit 22f receives the error message, then it transmits the error message to the control unit 11e using the communications units 22g and 21f, and terminates the process.

STEP 334: If the control unit 21e receives the key information message, it obtains the key recovery information for the subsequent key recovery device in the processes in STEPS 305 through 321. The process is continued for the number of the key recovery devices to which the authority is distributed.

STEP 335: When the process in STEP 332 is completed, the control means 22f transmits the key information to the key recovery unit 22d.

STEP 336: The key recovery unit 22d recovers the data key according to the key information. In the parallel method, the key is recovered from the key information for which the authority is distributed for security. In the serial method, the key information is the data key itself.

STEP 337: The key recovery unit 22d transmits the data key to the control unit 22f.

STEP 338: The control unit 22f generates a key response message based on the key, and transmits the message to the communications unit 21f through the communications unit 22g.

STEP 339: The communications unit 21f transmits a key response message to the control unit 21e, and the control unit 21e informs the recoverer that the key has been recovered. Thus, the process terminates.

Figure 16:
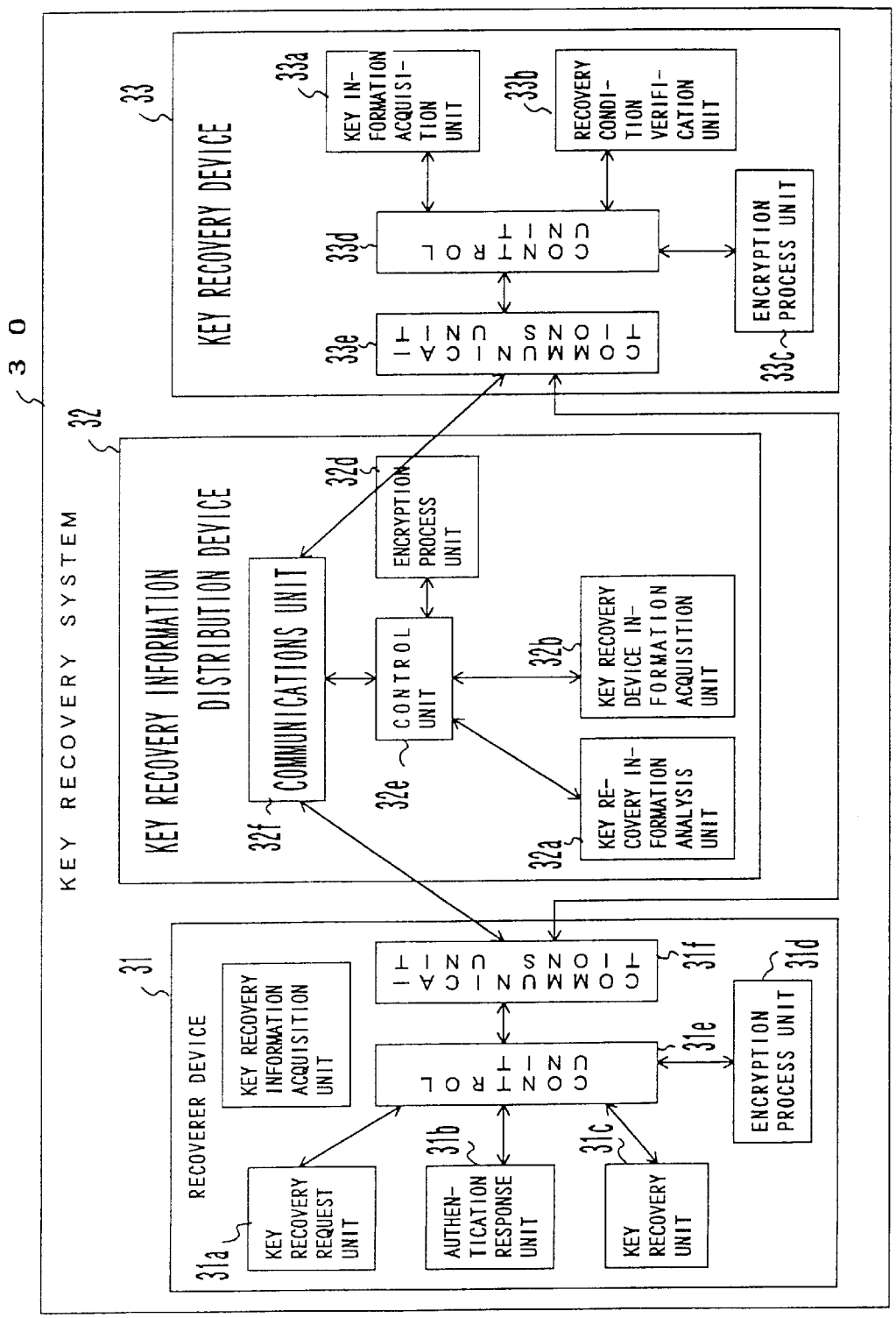
FIG. 16 is a block diagram showing a further embodiment of the present invention.

FIG. 16 shows an embodiment of a key recovery system 30 in which a key recovery unit 31c is provided in a recoverer device 31 and an authenticating operation is performed by directly connecting the key recovery device 33 to the recoverer device 31 without going through a key recovery information distribution device 32.

Figure 17:
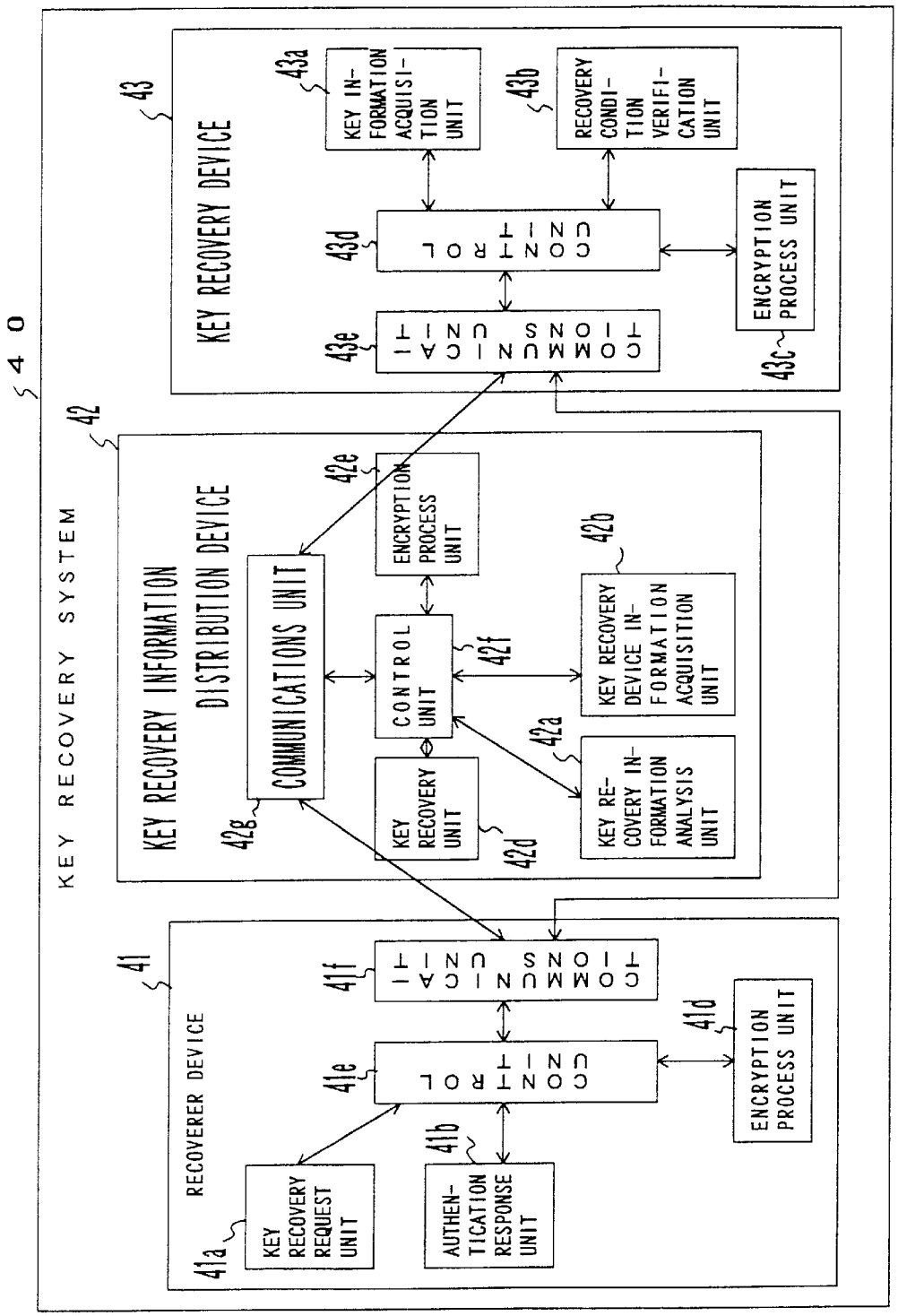
FIG. 17 is a block diagram showing a further embodiment of the present invention.

FIG. 17 shows an embodiment of a key recovery system 40 in which a key recovery unit 42a is provided in a key recovery information distribution device 42 and an authenticating operation is performed by directly connecting the key recovery device 43 to a recoverer device 41 without going through a key recovery information distribution device 42.

FIG. 18 shows an embodiment of a key recovery system 50 in which a key recovery unit 51c and a data recovery unit 51g are provided in a recoverer device 51.

Figure 19:
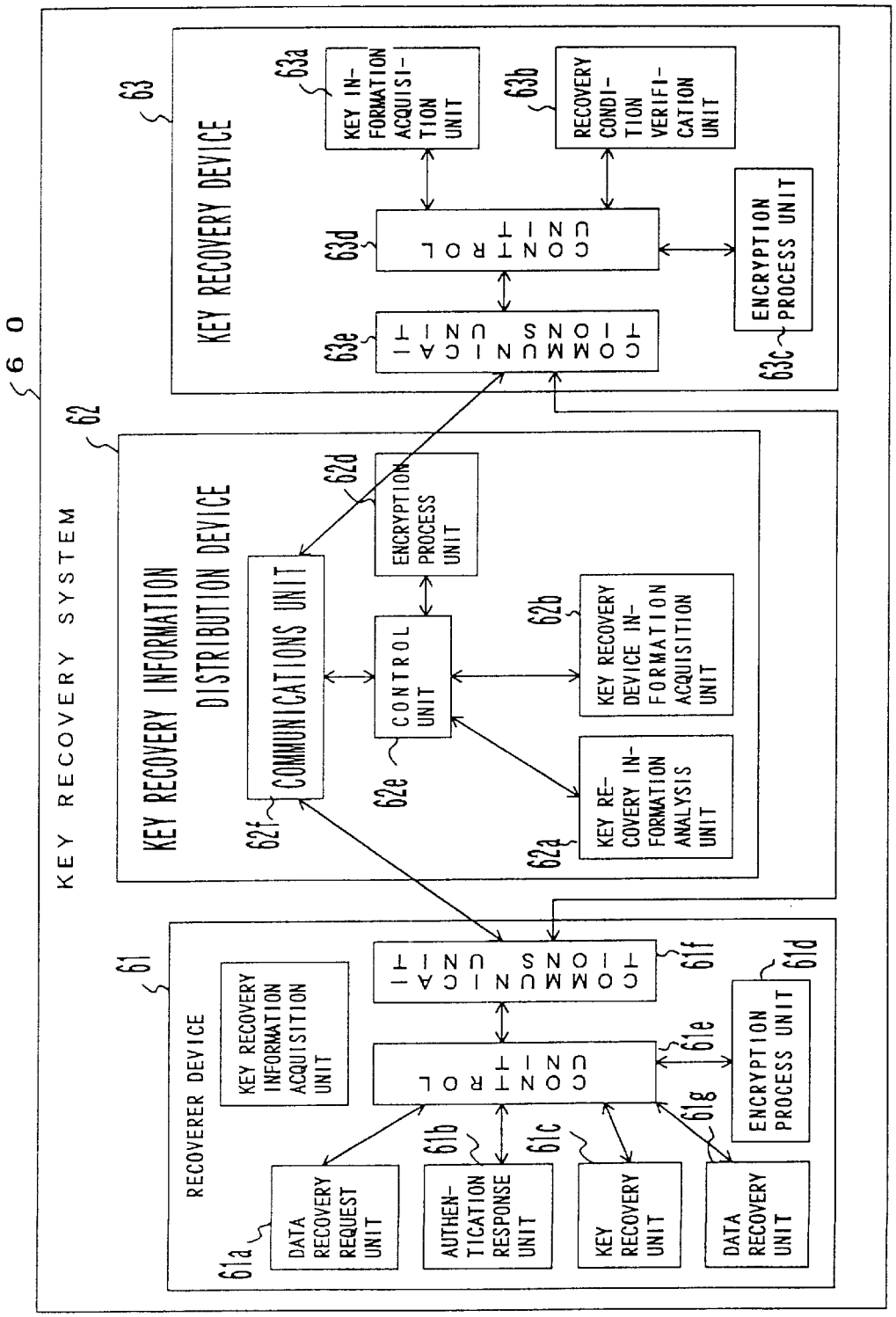
FIG. 19 is a block diagram showing a further embodiment of the present invention.

FIG. 19 shows an embodiment of a key recovery system 60 in which a key recovery unit 61c and a data recovery unit 61g are provided in a recoverer device 61, and an authenticating operation is performed by directly connecting the key recovery device 63 to a recoverer device 61.

Figure 20:
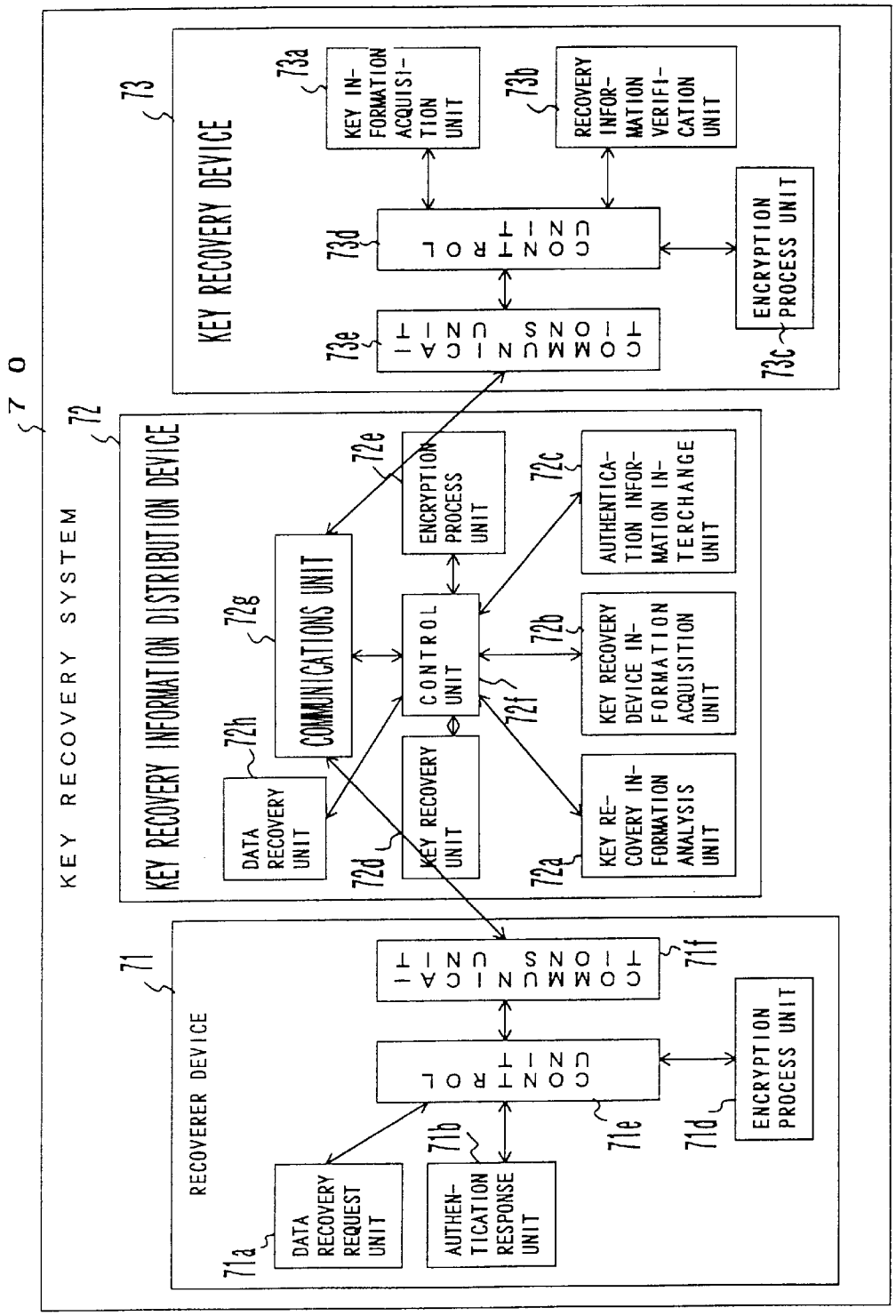
FIG. 20 is a block diagram showing a further embodiment of the present invention.

FIG. 20 shows an embodiment of a key recovery system 70 in which a data recovery unit 72h and a key recovery unit 72d are provided in a key recovery information distribution device 72.

Figure 21:
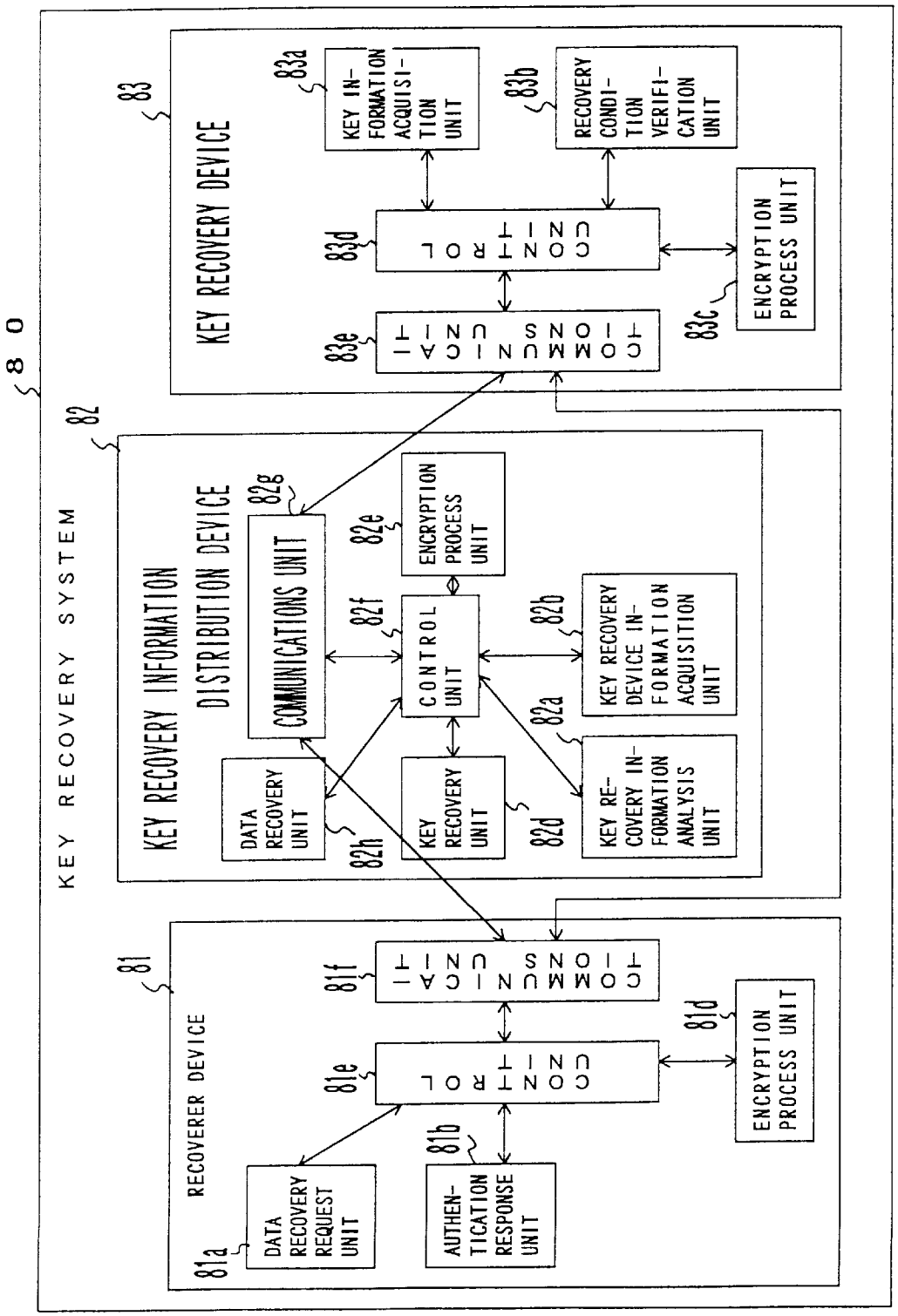
FIG. 21 is a block diagram showing a further embodiment of the present invention.

FIG. 21 an authenticating operation is performed by directly connecting the key recovery device 83 to the recoverer device 81 in the embodiment shown in FIG. 20.

In FIGS. 16 through 21, each of the components is assigned a reference number corresponding to FIG. 15, and the detailed explanation is omitted here.

When an authenticating operation is performed through a key recovery information distribution device 6 as shown in FIG. 2, a communications line is established when the recoverer device 4 transmits key recovery information to the key recovery device 5. Therefore, an authentication request from the key recovery device 5 can be issued through the communications line established from the recoverer device 4 which requested key recovery to the key recovery device 5. If communications are established directly between a recoverer device 4 and a key recovery device 5 without going through a key recovery information distribution device 6 to perform an authenticating operation, a new communications line should be established when the key recovery device 5 transmits an authentication request to the recoverer device 4. Therefore, the recoverer device 4 may be in a busy state when the key recovery device 5 calls the recoverer device 4.

FIG. 22 shows the configuration of an information processing device (computer) which realizes a key recovery system according to the present invention. The information processing device comprises a CPU (central processing unit) 431, a memory 432, a input device 433, a output device 434, a external storage device 435, a medium drive device 436, and a network connection device 437. These units are interconnected through a bus 438.

The CPU 431 executes a program stored in the memory 432. In addition to the program, the memory 432 stores data used in a process. The memory 432 can be, for example, ROM (read-only memory), RAM (random access memory), etc.

The input device 433 corresponds to the input device, for example, a keyboard, a pointing device, etc. The output device 434 corresponds to the output device, for example, a display device, a printer, etc.

The external storage device 435 can be, for example, a magnetic disk device, an optical disk device, an optical magnetic disk device, etc. The external storage device 435 can store the above described program and data, and uses them by loading them onto the memory 432 as necessary. Furthermore, the external storage device 435 can be used as a database.

The medium drive device 436 drives a portable storage medium 439 and accesses the stored data. The portable storage medium 439 can be an optional computer-readable storage medium such as a memory card, a floppy disk, a CD-ROM (compact disk read only memory), an optical disk, an optical magnetic disk, etc. The portable storage medium 439 stores the above described program and data, and can use them by loading them onto the memory 432.

The network connection device 437 is connected to an optional communications network such as a LAN (local area network), etc., and converts data, etc. to establish communications.

According to the above described embodiment, a testament is explained as an example. That is, when a private key which decrypts a data key K for use in encrypting the testament is lost, the data key is recovered through a key recovery device. The present invention is not limited to this application, but can be used by common companies and organizations. For example, when private information is encrypted and stored in a general affairs department in a company, the present invention can be used if a private key, opposite to a public key for use in encrypting the data key K, has been lost, or if an operator of the key is absent. Furthermore, the present invention can be used when encrypted data are used in personal communications.

As described above, according to the present invention, key recovery devices to which the authority is distributed can be accessed even if a recoverer device does not know all key recovery devices through a key recovery information distribution device. The authentication of a recoverer can be performed directly between a recoverer device and a key recovery device, and then the key recovery device can return the key to the recoverer device, thereby preventing an illegal operation by a service provider, etc. and largely contributing to the improvement of security of a key recovery system.

What is claimed is:

1. A key recovery system for storing encrypted data and key recovery information containing a data key for providing said encrypted data, retrieving the data key from the key recovery information, and decrypting the encrypted data, comprising:

a recoverer device for providing a recovery request for said data key from a recoverer;

a key recovery information distribution device for providing a communications line in response to said recovery request; and at least one key recovery device, connected to said recoverer device through said communications line, for decrypting all or a part of the data key in the key recovery information, authenticating said recoverer by communicating directly with said recoverer device through said communications line or a direct connection line between said recoverer device and said key recovery device, and providing key information corresponding to said data key to said recoverer device.

2. The system according to claim 1, wherein said recoverer is authenticated using a message encrypted by a session key shared between said recoverer device and said key recovery device.

3. The system according to claim 1, wherein said key recovery information further comprises a key recovery condition.

4. The system according to claim 1, wherein said data key is encrypted using a public key obtained from said key recovery device and stored as the key recovery information in said recoverer device; said encrypted data is normally decrypted using the data key, but when there is no private key opposing to said public key in said recoverer device, the data key is decrypted according to the key recovery information.

5. The system according to claim 1, wherein said key recovery information further comprises a key recover condition; said recovery request is transmitted to said key recovery device through said key recovery information distribution device; said recoverer is authenticated directly between said recoverer device and said key recovery device according to a recovery condition through said key recovery information distribution device; when said recoverer is authenticated, said key recovery device transmits key information to said recoverer device through said key recovery information distribution device; and said recoverer device recovers said data key according to the key information.

6. The system according to claim 5, wherein said recoverer is authenticated according to a message encrypted by a session key shared between said recoverer device and said key recovery device.

7. The system according to claim 5, wherein said key information transmitted from said key recovery device to said recoverer device is encrypted by a session key common between said key recovery device and said recoverer device.

8. The system according to claim 5, wherein
said recoverer device recovers data based on the data key.

9. The system according to claim 5, wherein
said recoverer is authenticated through said direct connection line between said recoverer device and said key recovery device without said key recovery information distribution device.

10. The system according to claim 9, wherein
said recoverer device recovers data based on said data key.

11. The system according to claim 1, wherein
said key recovery information further comprises a key recovery condition; a recover request is transmitted to said key recovery device through said key recovery information distribution device; said recoverer is authenticated directly between said recoverer device and said key recovery device according to a recovery condition through said key recovery information distribution device; when said recoverer is authenticated, said key recovery information distribution device obtains the key information from said key recovery device; and said key recovery information distribution device recovers the data key according to the key information, and transmits the data key to said recoverer device.

12. The system according to claim 11, wherein
said recoverer is authenticated through a direct connection line between said recoverer device and said key recovery device without said key recovery information distribution device.

13. The system according to claim 1, wherein
said key recovery information further comprises an ID of said key recovery device.

14. The system according to claim 1, wherein
authority for said key recovery information is distributed in a parallel method to each key recovery device.

15. The system according to claim 1, wherein
said key recovery information distribution device comprises as a database an ID of said key recovery device, a name of each key recovery device, an access address of each key recovery device, and a correspondence table of a communications protocol.

16. A key recovery system comprising:
a recoverer device for storing an encrypted sentence with key recovery information, transmitting a key recovery request when the key recovery request is received, transmitting authentication response information by a key recoverer's inputting authentication information when an authentication request is received, and recovering a key when key information is received;
a key recovery information distribution device for obtaining access information according to the key recovery information and distributing the key recovery information when the key recovery information is received from said recoverer device, transmitting an authentication request to said recoverer device when the authentication request is received, transmitting an authentication response when the authentication response is received from said recoverer device, and transmitting the key information to said recoverer device when the key information is received; and
at least one key recovery device, which is accessed based on said access information by said key recovery information distribution device, for obtaining the key information from the key recovery information when the key recovery information is received, decrypting a recovery condition according to the key information, transmitting the authentication request based on the recovery condition to said recoverer device through said key recovery information distribution device, authenticating a recoverer directly with said recoverer device by verifying the authentication response when the authentication response is received from said recoverer device, and transferring the key information to said recoverer device through said key recovery information distribution device when the recoverer is successfully authenticated.

17. A recoverer device, which is used in a key recovery system for recovering a key by distributing key recovery information from the recoverer device to at least one key recovery device through a key recovery information distribution device, comprising means for storing an encrypted sentence with the key recovery information, means for authenticating a recoverer directly with the key recovery device by transmitting a key recovery request when the key recovery request is received, means for transmitting authentication response information by the recoverer's inputting authentication information when an authentication request is received, and means for recovering the key when key information is received.

18. A key recovery information distribution device, which is used in a key recovery system for recovering a key by distributing key recovery information from the recoverer device to at least one key recovery device through the key recovery information distribution device, comprising means for obtaining access information about the key recovery device from a database according to the key recovery information when the key recovery information is received from the recoverer device, means for transmitting an authentication request to the recoverer device when the authentication request is received, means for transmitting an authentication response to the key recovery device when the authentication response is received from the recoverer device in response to the authentication request, and means for transmitting key information to the recoverer device when the key information is received.

19. A key recovery device, which is used in a key recovery system for recovering a key by distributing key recovery information from a recoverer device to at least one key recovery device through a key recovery information distribution device, comprising means for obtaining the key from the key recovery information when the key recovery information is received, decrypting a recovery condition using the key, means for transmitting to the recoverer device an authentication request based on the recovery condition, verifying an authentication response when the authentication response is received from the recoverer device, and means for transferring key information to the recoverer device when the authentication response is successfully verified.

20. A key recovery system comprising:
a recoverer device for providing a key recovery request for a data key from a recoverer;
a key recovery information distribution device for providing a communications line in response to the key recovery request;
at least one key recovery device, connected to said recoverer device through said communications line, for decrypting the data key or data key information in key recovery information;
means for transmitting the key recovery information from said recoverer device to each key recovery device through said communications line, and recovering the data key and a recovery condition;

means for authenticating said recoverer by direct communications between said recoverer device and said key recovery device under the recovery condition; and means for transmitting to said recoverer device the data key or the data key information recovered by said key recovery device when the recoverer is authenticated.

21. A key recovery method comprising:

a recoverer step for storing encrypted data and key recovery information comprising an encrypted data key and a recovery condition, and providing a key recovery request for the data key when there is no key for decrypting the data key; a key recovery information distributing step for providing a communications line in response to said recovery request; and at least one key recovery step, corresponding to said key recovery information distributing step, for decrypting the data key or a part of the data key in the key recovery information and authenticating a recoverer by communicating directly with said recoverer step through said communications line or a direct connection line between said recoverer step and said key recovery step.

22. The method according to claim 21, wherein said recovery request is transmitted to said key recovery step through said key recovery information distributing step, said recoverer is authenticated according to the recovery condition directly between said recoverer step and said key recovery step through said key recovery information distributing step; a key recovery step transmits key information through said key recovery information distributing step when the recoverer is successfully authenticated; and said recoverer step recovers a key according to the key information.

23. The method according to claim 21, wherein said recovery request is transmitted to said key recovery step through said key recovery information distributing step, said recoverer is authenticated according to the recovery condition directly between said recoverer step and said key recovery step through said key recovery information distributing step; said key recovery information distributing step obtains key information from said key recovery step when the recoverer is successfully authenticated; and said key recovery information distributing step recovers the key according to the key information, and transmits the key to said recoverer step.

24. A key recovery method comprising:

a recoverer step for storing an encrypted sentence with key recovery information, transmitting a key recovery request when the key recovery request is received, transmitting authentication response information by a key recoverer's inputting authentication information when an authentication request is received, and recovering a key when key information is received;

a key recovery information distributing step for obtaining access information about a key recovery step from a database according to the key recovery information and distributing the key recovery information to the key recovery step when the key recovery information is received from said recoverer step, and transmitting the key information to said recoverer step when the key information is received; and key recovery step for obtaining the key information when the key recovery information is received, transmitting an authentication request to said recoverer step through said key recovery information distributing step, verifying an authentication response when the authentication response is received from said recoverer step, and transferring the key information to said recoverer step through said key recovery information distributing step when the authentication response is successfully verified.

25. A key recovery method for recovering a data key when there is no key for decrypting the data key using a recoverer device for providing a key recovery request for the data key from a recoverer, a distribution device for providing a communication line for a corresponding key recovery device in response to said key recovery request, and at least one key recovery device for decrypting a part of data key information in key recovery information, said method comprising the steps of:

transmitting the key recovery information from the recoverer device to each key recovery device through said communications line to recover the data key and a recovery condition;

authenticating said recoverer by direct communications between the recoverer device and the key recovery device under the recovery condition; and transmitting the key recovered by the key recovery device to the recoverer device when the recoverer is successfully authenticated.

26. A computer-readable storage medium used to direct a computer to perform:

a recoverer function for storing encrypted data and key recovery information comprising a data key encrypted using a public key and a recovery condition, normally recovering the encrypted data using the data key, but providing a key recovery request for the data key when there is no key for decrypting the data key; a key recovery information distributing function for providing a communications line for a corresponding key recovery function in response to said key recovery request; and at least one key recovery function for decrypting the data key or a part of the data key in the key recovery information and authenticating a recoverer by communicating directly with said recoverer function through said communications line or a direct connection line between said recoverer function and siad key recovery function.

27. A computer-readable storage medium used to direct a computer to perform:

a recoverer function for storing an encrypted sentence with key recovery information, transmitting a key recovery request when the key recovery request is received, transmitting authentication response information by a key recoverer's inputting authentication information when an authentication request is received, and recovering a key when key information is received;

a key recovery information distributing function for obtaining access information about a key recovery function from a database according to the key recovery information and distributing the key recovery information to the key recovery function when the key recovery information is received from said recoverer function, transmitting an authentication request to said recoverer function when the authentication request is received, transmitting an authentication response to the recoverer function when the authentication response is received from said recoverer function in response to the authentication request, and transmitting the key information to said recoverer function when the key information is received; and key recovery function for obtaining the key information when the key recovery information is received, transmitting an authentication request to said recoverer function through said key recovery information distributing function, authenticating a recoverer directly with said recoverer function by verifying an authentication response when the authentication response is received from said recoverer function, and transferring the key information to said recoverer function through said key recovery information distributing function when the authentication response is successfully verified.

28. A computer-readable storage medium used to direct a computer to perform:
a recoverer function for providing a key recovery request for a data key from a recoverer;
a key recovery information distributing function for providing a communication line for a corresponding key recovery function in response to the key recovery request;
at least one key recovery function for decrypting a part of data key information in key recovery information;
a function of transmitting the key recovery information from the recoverer function to each key recovery function through said communications line to recover the data key and a recovery condition;
a function of authenticating said recoverer by direct communication between said recoverer function and said key recovery function under the recovery condition; and
a function of transmitting the key recovered by said key recovery function to said recoverer function when the recoverer is successfully authenticated.

29. A computer-readable storage medium used to direct a computer to perform the function of:
storing an encrypted sentence with key recovery information, authenticating a recoverer directly with a key recovery function by transmitting a key recovery request when the key recovery request is received, transmitting authentication response information by a key recoverer's inputting authentication information when an authentication request is received, and recovering a key when key information is received.

30. A computer-readable storage medium used to direct a computer to perform the function of:
a key recovery information distributing function for obtaining access information about a key recovery function from a database according to the key recovery information when the key recovery information is received from said recoverer function, transmitting an authentication request to said recoverer function when the authentication request is received, authenticating a recoverer directly between the recoverer function and the key recovery function by transmitting an authentication response to the key recovery function when the authentication response is received from said recoverer function in response to the authentication request, and transmitting the key information to said recoverer function when the key information is received.

31. A computer-readable storage medium used to direct a computer to perform:
a key recovery function for obtaining a key from key recovery information when the key recovery information is received, decrypting a recovery condition using the key, transmitting an authentication request based on the recovery condition to said recoverer function, authenticating a recoverer directly between the recoverer function and a key recovery function by verifying an authentication response when the authentication response is received from the recoverer function, and transferring the key information to the recoverer function when the recoverer is successfully authenticated.

32. A key recovery system for storing encrypted data and key recovery information containing data key for providing said encrypted data, retrieving the data key from the key recovery information, and decrypting the encrypted data, comprising:
a recoverer device for providing a recovery request for said data key from a recoverer;
a key recovery information distribution device for providing a communications line in response to said recovery request; and
at least one key recovery device, connected to said communications line, for decrypting and retrieving all or a part of the data key from the key recovery information, authenticating said recoverer directly with the recoverer device, and providing key information corresponding to said data key to said recoverer device,
wherein said key recovery information further comprises a key recovery condition; a recover request is transmitted to said key recovery device through said key recovery information distribution device; said recoverer is authenticated directly between said recoverer device and said key recovery device according to a recovery condition through said key recovery information distribution device; when said recoverer is authenticated, said key recovery information distribution device obtains the key information from said key recovery device; and said key recovery information distribution device recovers the data key according to the key information, and transmits the data key to said recoverer device, and
wherein said key recovery information distribution device recovers data based on said data key.

33. A key recovery system for storing encrypted data and key recovery information containing data key for providing said encrypted data, retrieving the data key from the key recovery information, and decrypting the encrypted data, comprising:
a recoverer device for providing a recovery request for said data key from a recoverer;
a key recovery information distribution device for providing a communications line in response to said recovery request; and
at least one key recovery device, connected to said communications line, for decrypting and retrieving all or a part of the data key from the key recovery information, authenticating said recoverer directly with the recoverer device, and providing key information corresponding to said data key to said recoverer device,
wherein said key recovery information further comprises a key recovery condition; a recover request is transmitted to said key recovery device through said key recovery information distribution device; said recoverer is authenticated directly between said recoverer device and said key recovery device according to a recovery condition through said key recovery information distribution device; when said recoverer is authenticated, said key recovery information distribution device obtains the key information from said key recovery device; and said key recovery information distribution device recovers the data key according to the key information, and transmits the data key to said recoverer device, and wherein said recoverer is authenticated through a direct connection line between said recoverer device and said key recovery device without said key recovery information distribution device, and further wherein said key recovery information distribution device recovers data based on said data key.

34. A key recovery system for storing encrypted data and key recovery information containing data key for providing said encrypted data, retrieving the data key from the key recovery information, and decrypting the encrypted data, comprising:

a recoverer device for providing a recovery request for said data key from a recoverer;

a key recovery information distribution device for providing a communications line in response to said recovery request; and at least one key recovery device, connected to said communications line, for decrypting and retrieving all or a part of the data key from the key recovery information, authenticating said recoverer directly with the recoverer device, and providing key information corresponding to said data key to said recoverer device, wherein authority for said key recovery information is distributed in a serial method to each key recovery device.

35. A method for recovering an encryption key, comprising:

storing an encrypted sentence including key recovery information;

authenticating a recoverer directly with a key recovery function by transmitting a key recovery request when the key recovery request is received from the recoverer;

transmitting authentication response information by the recoverer's inputting authentication information when an authentication request is received; and recovering a key when the authentication response is authenticated.

* * * * *